United States Patent [19]

Esaki

[11] Patent Number: 5,850,385
[45] Date of Patent: Dec. 15, 1998

[54] CELL LOSS RATE SENSITIVE ROUTING AND CALL ADMISSION CONTROL METHOD

[75] Inventor: Hiroshi Esaki, Basking Ridge, N.J.

[73] Assignee: Kabushiki Kaisha Toshiba, Kawasaki, Japan

[21] Appl. No.: 371,514

[22] Filed: Jan. 11, 1995

Related U.S. Application Data

[63] Continuation of Ser. No. 765,009, Sep. 24, 1991, abandoned.

[51] Int. Cl.$^6$ ........................................................ H04J 1/16
[52] U.S. Cl. .......................................... 370/216; 370/395
[58] Field of Search ............................... 370/16, 17, 94.1,
370/60, 94.3, 85.1, 85.6, 84, 216, 218,
227, 228, 229, 230, 231, 232, 233, 234,
235, 237, 252, 395, 389, 401, 408, 351,
358, 356, 468; 371/11.1; 340/827, 825.5,
825.51, 825.52, 825.01, 825.02; 379/113,
221; 395/181

[56] References Cited

U.S. PATENT DOCUMENTS

| | | | |
|---|---|---|---|
| 4,308,613 | 12/1981 | Chasek | 370/14 |
| 4,704,724 | 11/1987 | Krishnan et al. | 379/221 |
| 4,864,560 | 9/1989 | Quinquis et al. | 370/60 |
| 4,870,641 | 9/1989 | Pattavina | 370/60 |
| 4,893,304 | 1/1990 | Giacopelli et al. | 370/60 |
| 4,933,932 | 6/1990 | Quinquis et al. | 370/60 |
| 4,939,718 | 7/1990 | Servel et al. | 370/60 |
| 4,939,719 | 7/1990 | Bakka | 370/60 |
| 4,939,720 | 7/1990 | Bakka | 370/60 |
| 4,955,017 | 9/1990 | Eng et al. | 370/60 |
| 4,970,721 | 11/1990 | Aczel et al. | 370/92 |
| 4,984,264 | 1/1991 | Katsube | 379/197 |
| 4,999,835 | 3/1991 | Laqoutte | 370/94.1 |
| 5,007,043 | 4/1991 | van den Dool et al. | 370/60 |
| 5,007,048 | 4/1991 | Kowalk | 370/60 |
| 5,038,340 | 8/1991 | Ochiai | 370/54 |

(List continued on next page.)

OTHER PUBLICATIONS

B. N. Ma, J. W. Mark: "Performance Analysis of Burst Switching for Integrated Voice/Data Services," IEEE Trans. on COM., vol. 36, No. 3, pp. 282–297, Mar., 1988.

M. Hirano, N. Watanbe: "Characteristics of a Cell Multiplexer for Bursty ATM Traffic," ICC '89, 13.2, vol. 1, pp. 399–403, Jun., 1989.

T. Kamitake, T. Suda: "Evaluation of an Admission Control Scheme for an ATM Network Considering Fluctuations in Cell Loss Rate," Globecom89, 49.4, vol. 3, pp. 1774–1780, Nov., 1989.

A. E. Eckberg, D. T. Luan, D. M. Lucantoni: "Meeting the Challenge: Congestion and Flow Control Strategies for Broadband Information Transport," Globecom89, 49.3, vol. 3, pp. 1769–1773, Nov., 1989.

H. Ohnishi, T. Okada, K. Noguchi: "Flow Control Schemes and Delay/Loss Tradeoff in ATM Networks," IEEE Journal on Selected Area in Communications, vol. 6, No. 9, pp. 1609–1616, Dec., 1988.

(List continued on next page.)

*Primary Examiner*—Dang Ton
*Attorney, Agent, or Firm*—Foley & Lardner

[57] ABSTRACT

A cell loss rate routing and a call admission control method and evaluation of ATM traffic. The two main communication qualities for connection oriented calls in an ATM network are the cell loss rate and the link delay. The purpose of routing control in an ATM network is to achieve high network throughput while guaranteeing both of these qualities. When high speed bursty calls are multiplexed in ATM fashion, the cell loss rate is more sensitive to offered load than the queuing delay. Usually, the cell loss rate grows large at lower offered load, even though the queuing delay is small. Moreover, the cell loss rate is determined not only by the offered load but also by other parameters, such as the burstiness and the percentage of high speed calls. Therefore, both the call admission control and the routing control methods in an ATM network are cell loss rate sensitive.

6 Claims, 15 Drawing Sheets

U.S. PATENT DOCUMENTS

| | | | |
|---|---|---|---|
| 5,042,027 | 8/1991 | Takase et al. | 370/60 |
| 5,067,127 | 11/1991 | Ochiai | 370/95.1 |
| 5,079,760 | 1/1992 | Nemirovsky et al. | 370/17 |
| 5,126,999 | 6/1992 | Munter et al. | 370/60 |
| 5,128,932 | 7/1992 | Li | 370/60 |
| 5,132,966 | 7/1992 | Hayano et al. | 370/85.6 |
| 5,142,653 | 8/1992 | Schetts | 375/10 |
| 5,153,877 | 10/1992 | Esaki et al. | 310/94.1 |
| 5,166,894 | 11/1992 | Saito | 379/197 |
| 5,179,556 | 1/1993 | Turner | 370/84 |
| 5,267,232 | 11/1993 | Katsube et al. | 370/17 |
| 5,335,222 | 8/1994 | Kamoi et al. | 370/60 |

OTHER PUBLICATIONS

P. Joos, W. Verbiest: "A Statistical Bandwidth Allocation and Usage Monitoring Algorithm for ATM Networks," ICC '89, 13.5, vol. 1, pp. 415–422, Jun., 1989.

H. Suzuki, T. Murase, S. Sato, T. Takeuchi: "A Burst Traffic Control Strategy for ATM Networks," Globecom90, 505.6, vol. 2, pp. 874–878, Dec., 1990.

H. Esaki, K. Iwamura, T. Kodama: "A Simple and Effective Admission Control Method for an ATM Network," Globecom90, 300.4, vol. 1, Dec., 1990.

D. Bertsekas, R. Gallager: *Data Networks*, New Jersey, USA: Prentice Hall, 1987.

R. Gallager: "A Minimum Delay Routing Algorithm Using Distributed Computation," IEEE Trans. on Com., vol. 25, No. 1, pp. 73–85, Jan., 1977.

G. J. Foschini, J. Salz: "A Basic Dynamic Routing Problem and Diffusion," IEEE Trans. on Com., vol. 26, No. 3, pp. 320–327, Mar., 1978.

J. M. McMillan, I. Richer, E.C. Rosen: "The New Routing Algorithm for the Arpanet," IEEE Trans. on Com., vol. 28, No. 5, pp. 711–719, May, 1980.

S. Wecker: "DNA The Digital Network Architecture," IEEE Trans. on COM., vol. 28, pp. 510–526, 1980.

A. Ephremides, P. Varaiya, J. Walrand: "A Simple Dynamic Routing Problem," IEEE Trans. on AC, vol. 25, No. 4, pp. 690–693, Aug., 1980.

D. P. Bertsekas: "Dynamic Behavior of Shortest Path Routing Algorithms for Communication Networks," IEEE Trans. on AC., vol. 27, No. 1, pp. 60–74, Feb. 1982.

F. H. Moss, A. Segall: "An Optimal Control Approach to Dynamic Routing in Networks," IEEE Trans. on AC., vol. 27, No. 2, pp. 329–339, Apr., 1982.

D. Bertsekas, E. M. Gafni, R. G. Gallager: "Second Derivative Algorithms for Minimum Delay Distributed Routing in Networks," IEEE Trans. on COM., vol. 32, No. 8, pp. 911–919, Aug., 1984.

Z. Rosberg: "Deterministic Routing to Buffered Channels," IEEE Trans. on COMM., vol., 34, No. 5, pp. 504–507, May, 1986.

K. H. Muralidhar, M.K. Sundareshan: "Combined Routing and Flow Control in Computer Communication Networks: A Two–Level Adaptive Scheme," IEEE Trans. on AC, vol. 32, No. 1, Jan., 1987

J.Y. Hui: "Resource Allocation for Broadband Networks," IEEE Journal on Selected Area in Communications, vol. 6, No. 9, pp. 1598–1608, Dec., 1988.

C. G. Cassandras, M. H. Kallmes, D. Towsley: "Optimal Routing and Flow Control in Networks with Real–Time Traffic," Infocom89, vol. 3, pp. 784–791, Apr., 1989.

A. Khanna, J. Zinky: "The Revised Arpanet Routing Metric," Sigcomm89, Sep., 1989.

T. Akaike, T. Takenaka, K. Takami: "Evaluations of Multimedia Packet Switching System with Bursty Sources," (in Japanese), Tech. Rep. IEICE, IN87–15, vol. 87, No. 106, pp. 1–6 Jul., 1987.

J. Virtamo, J. Roberts: "Evaluating Buffer Requirements in ATM Multiplexer," Globecom89, 41.4, vol. 3, pp. 1473–1477, Nov., 1989.

Y. Katsube, K. Iwamura, T. Kodama: "An Analytical Evaluation of Statistically Multiplexed Traffic in ATM Network," (in Japanese), Tech. Rep. IEICE, IN88–141, vol. 88, No. 442, pp. 13–18, Feb., 1989.

A. Pattavina: "Fairness in a Broadband Packet Switch," ICC '89, 13.3, vol. 1, pp. 401–409, Jun., 1989.

H. Esaki, K. Iwamura, T. Kodama: "An Evaluation of Characteristics for Successive Cell Loss in an ATM Network,", Autumn National Conversation Record IEICE, B–156, Sep., 1989.

T. Akaike, T. Takensaka, K. Takami: "Evaluations of Multi–Media Packet Switching System With Bursty Sources".

Legend:
 Control office exchange

Legend:

Control office exchange

CELL LOSS RATE SENSITIVE ROUTING AND CALL ADMISSION CONTROL METHOD

This application is a continuation, of application Ser. No. 07/765,009, filed Sep. 24, 1991, now abandoned.

BACKGROUND OF THE INVENTION

The following list of references provides general background information to the field of the invention and each of the references is incorporated herein by reference.

References

[1] B. N. Ma, J. W. Mark: "Performance Analysis of Burst Switching for Integrated Voice/Data Services," IEEE Trans. on COM., Vol. 36, No. 3, pp. 282–297, March, 1988.

[2] M. Hirano, N. Watanabe: "Characteristics of a Cell Multiplexer for Bursty ATM Traffic," ICC '89, 13.2, Vol. 1, pp. 399–403, June, 1989.

[3] T. Kamitake, T. Suda: "Evaluation of an Admission Control Scheme for an ATM Network Considering Fluctuations in Cell Loss Rate," GLOBECOM89, 49.4, Vol. 3, pp. 1774–1780, November, 1989.

[4] A. E. Eckberg, D. T. Luan, D. M. Lucantoni: "Meeting the Challenge: Congestion and Flow Control Strategies for Broadband Information Transport," GLOBECOM89, 49.3, Vol. 3, pp. 1769–1773, November, 1989.

[5] H. Ohnishi, T. Okada, K. Noguchi: "Flow Control Scheme and Delay/Loss Tradeoff in ATM Network," IEEE Journal on Selected Area in Communications, Vol. 6, No. 9, pp. 1609–1616, December, 1988.

[6] P. Joos, W. Verbiest: "A Statistical Bandwidth Allocation and Usage Monotoring Algorithm for ATM Network," ICC '89, 13.5, Vol. 1, pp. 415–422, June, 1989.

[7] H. Suzuki, T. Murase, S. Sato, T. Takeuchi: "A Burst Traffic Control Strategy for ATM Networks," GLOBECOM90, 505.6, Vol. 2, pp. 874–878, December, 1990.

[8] H. Esaki, K. Iwamura, T. Kodama: "Simple and Effective Admission Control Method for an ATM Network," GLOBECOM90, 300.4, Vol. 1, December, 1990.

[9] D. Bertsekas, R. Gallager: Date Networks, New Jersey, USA: Prentice Hall, 1987.

[10] R. Gallager: "A Minimum Delay Routing Algorithm Using Distributed Computation," IEEE Trans. on COM., Vol. 25, No. 1, pp. 73–85, January, 1977.

[11] G. J. Foschini, J. Salz: "A Basic Dynamic Routing Problem and Diffusion," IEEE Trans. on COM., Vol. 26, No. 3, pp. 320–327, March, 1978.

[12] J. M. McMillan, I. Richer, E. C. Rosen: "The New Routing Algorithm for the ARPANET," IEEE Trans. on COM., Vol. 28, No. 5, pp.711–719, May, 1980.

[13] S. Wecker: "The Digital Network Architecture," IEEE Trans. on COM., Vol. 28, pp. 510–526, 1980.

[14] A. Ephremides, P. Varaiya, J. Walrand: "A Simple Dynamic Routing Problem," IEEE Trans. on AC, Vol. 25, No. 4, pp. 690–693, August, 1980.

[15] D. P. Bertsekas: "Dynamic Behavior of Shortest Path Routing Algorithms for Communication Networks," IEEE Trans. on AC., Vol. 27, No. 1, pp. 60–74, February, 1982.

[16] F. H. Moss, A. Segall: "An Optimal Control Approach to Dynamic Routing in Networks," IEEE Trans. on AC., Vol. 27, No. 2, pp. 329–339, April, 1982.

[17] D. Bertsekas, E. M. Gafni, R. G. Gallager: "Second Derivative Algorithms for Minimum Delay Distributed Routing in Networks," IEEE Trans. on COM., Vol. 32, No. 8, pp. 911–919, August, 1984.

[18] Z. Rosberg: "Deterministic Routing to Buffered Channels," IEEE Trans. on COMM., Vol, 34, No. 5, pp. 504–507, May, 1986.

[19] K. H. Muralidhar, M. K. Sundareshan: "Combinated Routing and Flow Control in Computer Communication Networks: A Two-Level Adaptive Scheme," IEEE Trans. on AC, Vol. 32, No. 1, January, 1987.

[20] J. Y. Hui: "Resource Allocation for Broadband Networks," IEEE Journal on Selected Area in Communications, Vol. 6, No. 9, pp. 1598–1608, December, 1988.

[21] C. G. Cassandras, M. H. Kallmes, D. Towsley: "Optimal Routing and Flow Control in Networks with Real-Time Traffic," INFOCOM89, Vol. 3, pp. 784–791, April, 1989.

[22] A. Khanna, J. Zinky: "The Revised ARPANET Routing Metric," SIGCOMM89, September, 1989.

[23] T. Akaike, T. Takenaka, K. Takami: "Evaluation of Multi-media Packet Switching System with Bursty Sources," (in Japanese), Tech. Rep. IEICE, IN87-15, Vol. 87, No. 106, pp. 1–6 July, 1987.

[24] J. Virtamo, J. Roberts: "Evaluating Buffer Requirements in ATM Multiplexer," GLOBECOM89, 41.4, Vol. 3, pp. 1473–1477, November, 1989.

[25] Y. Katsube, K. Iwamura, T. Kodama: "An Analytical Evaluation of Statistical Multiplexing Traffic in ATM Network," (in Japanese), Tech. Rep. IEICE, IN88-141, Vol. 88, No. 442, pp. 13–18, February, 1989.

[26] A. Pattavina: "Fairness in a Broadband Packet Switch," ICC '89, 13.3, Vol. 1, pp. 401–409, June, 1989.

[27] H. Esaki, K. Iwamura, T. Kodama: "An Evaluation of Characteristics for Successive Cell Loss in an ATM Network," (in Japanese), Autumn National Conversation Record IEICE, B-156, September, 1989.

[28] U.S. Pat. No. 4,984,264

[29] U.S. Pat. No. 4,704,724

[30] U.S. Pat. No. 4,939,720

An ATM (Asynchronous Transfer Mode) network is one method for realizing a flexible and cost-effective network for handling a wide variety of communications. In an ATM network, various kinds of traffic, such as bursty or high speed calls, are multiplexed. Therefore, the multiplexed traffic load fluctuates heavily and rapidly, especially when high speed calls are multiplexed (Refs. 1–3).

Traffic control is one of the major problems in an ATM network. When congestion occurs, the buffer queue grows so long that some cells are discarded due to buffer overflow. Here, in ATM networks, the information from each user is transferred by cells which have a fixed size packet. Each cell comprises a pay-load and header. The pay-load conveys the user information and the header conveys information needed to transfer the cell to the appropriate destination. The objective of call admission control is to keep the network load moderate so as to satisfy the user requirements for communication quality, which are usually specified by the cell loss rate and the link delay (Refs. 4–8). The subject of routing control is to determine the best path between a certain node pair for achieving high network throughput (Refs. 9–22).

The conventional routing methods in data communication networks are link delay sensitive or load sensitive methods (Ref. 9–22). The term link delay is used to mean the total link delay between the source and destination which is generally a sum of the individual links over the plural node pairs between the source and destination. The link delay is made up of four components: the processing delay, queuing delay, transmission delay and propagation delay. These delays are defined as follows (See Ref. 9, pages 111–112):

1. The processing delay corresponds to the time between when the cell is correctly received at the head node of the link and the time the cell is assigned to an outgoing link queue for transmission.
2. The queuing delay corresponds to the time between when the packet is assigned to a queue for transmission and the time it starts being transmitted. During this time the cell waits while other cells in the transmission queue are transmitted.
3. The transmission delay corresponds to the time between when the first and last bits of the cells are transmitted.
4. The propagation delay corresponds to the time from when the last bit is transmitted at the head node of the link until it is received at the tail node.

The cost functions for conventional routing methods are measured delay, or an estimate of delay which is derived from the offered load. For high speed ATM systems, the link delay is dominated by the propagation delay and by the queuing delay. Since the propagation delay is determined by the distance between nodes, the propagation delay does not change even though the network load status changes. On the other hand, the queuing delay increases in accordance with the increase of the offered load.

SUMMARY OF THE INVENTION

It has been recognized in accordance with the principles of the invention, that with an ATM network, cell loss rate is more sensitive to offered load than queuing delay. Here, offered load is defined as the average utilization efficiency of the multiplexed line. Moreover, the cell loss rate and the queuing delay are determined not only by the offered load, but also by other traffic parameters, such as the cell transmission speed of each call. The cell transmission speed corresponds to the peak bit rate of each call. Usually, the cell loss rate grows large at a relatively low offered load, even though the queuing delay is small. And sometimes, even when the offered load of a certain multiplexed line is smaller than the load of the other multiplexed lines, the cell loss rate of the less loaded line can be greater than the cell loss rate of the more loaded line.

One aspect of the invention is directed toward a routing system which is sensitive to cell loss rate.

In accordance with another aspect of the invention, since ATM traffic is more sensitive to cell loss rate than to queuing delay, call admission control is made sensitive to cell loss rate in the ATM network. The call admission method is prioritized with respect to priority and non-priority calls.

Cell loss rate may be used as the cost function in the cell loss rate (CLR) sensitive method in accordance with the invention. The cell loss rate may be estimated by the peak bit rate and the average bit rate of each call, not just offered load. These are the traffic parameters used for the call set-up procedure. The estimated cell loss rate should accurately reflect the cell loss rate of real ATM traffic.

The CLR sensitive method is used, in a preferred embodiment of the invention, for the routing of connection oriented calls in an ATM network. The routine path is determined call by call, not cell by cell. Call admission control is performed based on estimated cell loss rate. When the estimated cell loss rate is larger than the required cell loss rate of a call, the call set-up request is rejected.

The invention may be characterized as a method for routing offered traffic through a network having nodes wherein each node is adapted to communicate with each of the other nodes. The method includes the step of generating sets of routes between source and destination node pairs wherein each route comprises at least one link interconnecting specific nodes, and controlling the selection of traffic routes between the source and destination node pairs from the corresponding sets of routes by evaluating the routes with respect to cell loss rates of the set.

In accordance with another aspect of invention, prior to the controlling step above, the method includes the step of selecting a subset of routes among the set of routes in which each route of the subset of routes has a propagation delay less than a maximum allowable propagation delay between the source and destination, and the step of controlling includes controlling the selection of traffic routes between the source and destination node pairs from the corresponding subsets of routes by evaluating the routes within the subset with respect to cell loss rates.

In accordance with yet another aspect of the invention, there is disclosed a method for routing offered traffic through a multi-stage switching network having input and output ports and a plurality of at least three switching stages interconnecting the input and output ports. The method includes the step of generating a set of switching routes between a given input and output port pair wherein the switching routes comprise links interconnecting specific switching stages. The method is characterized by controlling the selection of the traffic route between the given input and output port pair from the set of routes by evaluating the set of routes in response to the cell loss rates of the set to select the route with the smallest cell loss rate.

DETAILED DESCRIPTION OF THE PREFERRED EMBODIMENTS

1. Evaluation of ATM Traffic

It is first useful to evaluate the characteristics of cell loss rate and link delay in an ATM network. In ATM networks, link delay is mainly caused by the propagation delay and the queuing delay. Since propagation delay is determined by the distance between the nodes within the network, propagation delay is independent of the network's traffic status.

In an ATM network, calls are multiplexed, taking advantage of the statistical multiplexing effect. (See, for example, Ref. 9, pp. 112–113). When high speed calls are among the multiplexed calls, one can expect little statistical multiplexing effect (Ref. 8). As shown in the following evaluation, the traffic characteristics of the call is an important parameter in terms of the effect of statistical muliplexing. Here, the call characteristic of concern is the peak bit rate and the ratio of average bit rate to peak bit rate.

Therefore, the evaluation of cell loss rate and queuing delay is concerned with the percentage of high speed calls and the burstiness of each call. High speed calls have a large peak bit rate compared to the multiplexed line: its peak bit rate is around 1/10 of the bit rate of the multiplexed line. The peak bit rate of a low speed call is less than or equal to about 1/100.

It is next instructive to evaluate the characteristic of ATM traffic when high speed and low speed calls are multiplexed. The evaluation is performed through computer simulation of an output buffer type multiplexer using well known Monte Carlo methods. V is defined as the bit rate of the multiplexed line. $V_{pj}$ (j=1,2 . . . ) is defined as the peak bit rate of each call j, and $V_{aj}$ (j=1,2 . . . ) is defined as the average bit rate of each call j.

The simulation model is as follows. The buffer length of the multiplexer is 100 cells. Bursty calls are multiplexed. Each call has bursty and idle periods corresponding to a two-state Markov model. During bursty periods, each call transfers cells continuously and periodically at the speed of its own peak bit rate. The distribution of bursty periods is geometrical, and the average burst is 100 cells. During idle periods, each call transfers no cells. The distribution of idle periods is also geometrical.

Figure 1:
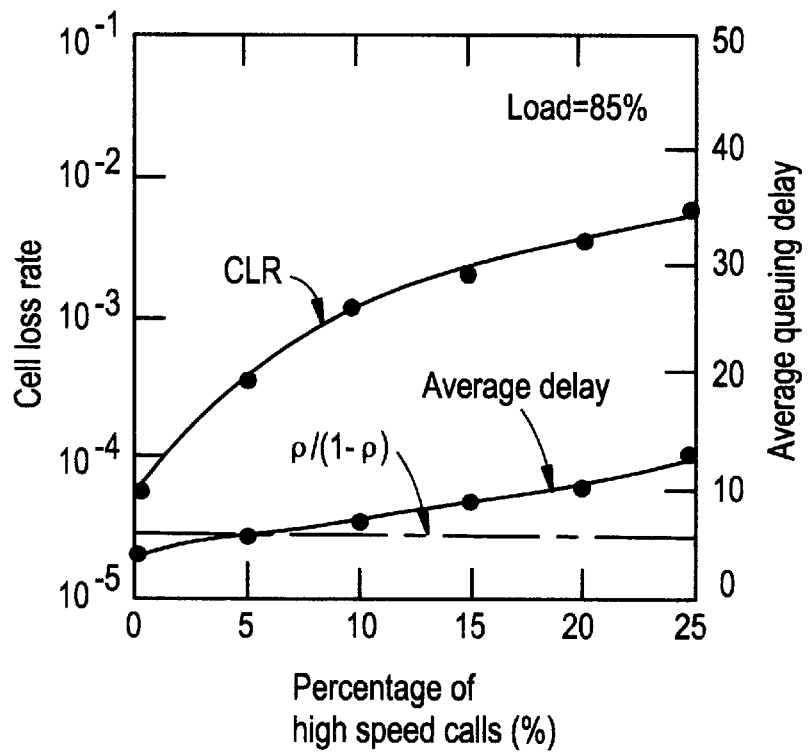
FIG. 1 shows the percentage of high speed calls vs. the cell loss rate and the average queuing delay, when the offered load is 85% in an ATM network in accordance with the present invention.

FIG. 1 shows the percentage of high speed calls vs. the cell loss rate and the average queuing delay, when the offered load is 85%. This figure is obtained through computer simulation. The average queuing delay is shown by the normalized delay value. One unit-time is defined as the time that one cell is transferred by the multiplexed line. Therefore, when the multiplexed line is 156 Mbps and the cell size is 53 bytes, one unit-time corresponds to about 3 μsec—more precisely, $2.72 \times 10^{-6}$ sec.

In FIG. 1, the high speed calls have $V_p$=V/10 and $V_a$=$V_p$/20. The low speed calls have $V_p$=V/100 and $V_a$=$V_p$/2. The horizontal axis shows the percentage of high speed calls in terms of the number of multiplexed calls. In this figure, cell loss rate, average queuing delay and $\rho/(1-\rho)$ are shown. $\rho/(1-\rho)$ is a frequently used formula for the cost function in conventional routing methods. This value corresponds to the average number of cells in the buffer for an M/M/1 queue. Here, $\rho$ is offered load of the corresponding queuing system. $\rho$ may be thought of as the efficiency and has limits $0 \leq \rho \leq 1$.

$\rho/(1-\rho)$ is a constant value, because $\rho/(1-\rho)$ depends only on the offered load. This means that conventional routing methods, which use $\rho/(1-\rho)$ as the cost function, do not take into account the percentage of high speed calls. Even though $\rho/(1-\rho)$ is a constant value, the diversity of cell loss rate is large—from $10^{-5}$ to $10^{-2}$. However, the diversity of the average queuing delay is not large. Moreover, the average queuing delay is relatively small: less than 15 unit-times (41 $\mu$sec with 156 Mbps ATM link).

Figure 2:
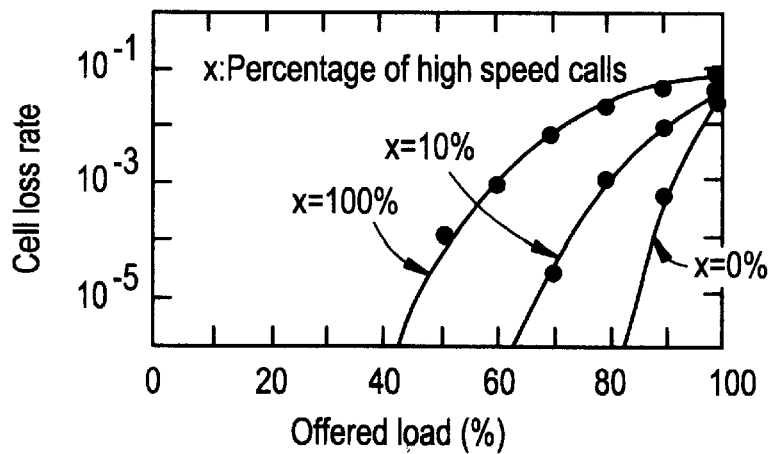
FIG. 2 shows the offered load vs. the cell loss rate in an ATM network in accordance with the present invention.
Figure 3:
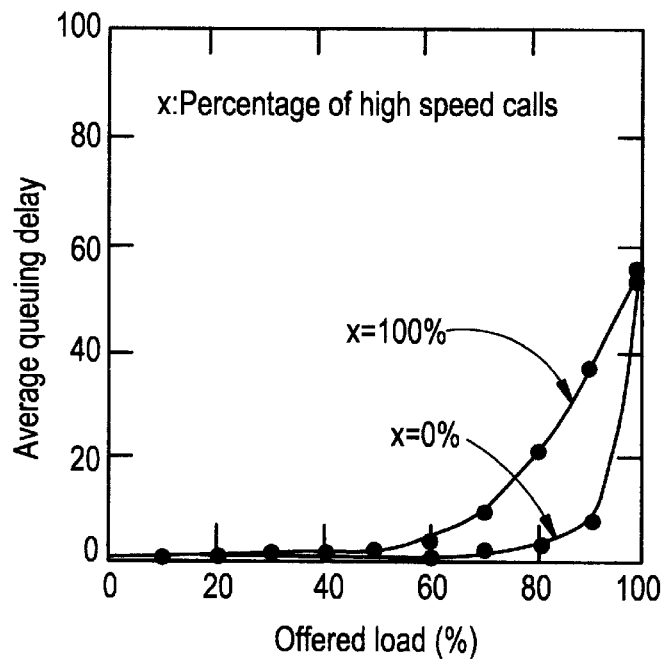
FIG. 3 shows the offered load vs. the average queuing delay in an ATM network in accordance with the present invention.

FIGS. 2 and 3 show the offered load vs. the cell loss rate and the average queuing delay, respectively. These figures are obtained through computer simulations. The high speed calls have $V_p = V/15$ and $V_a = V_p/100$. The low speed calls have $V_p = V/150$ and $V_a = V_p/2$. As the percentage of high speed calls increases, the maximum allowable load reduces rapidly. For example, when the required cell loss rate (i.e., the cell loss rate required by the user to the network during call set-up) is $10^{-3}$, the maximum allowable offered load, in terms of cell loss rate requirement, is about 60% when the traffic is 100% high speed calls, and about 80% when the traffic is 10% high speed calls. In contrast, the average queuing delays at these offered loads are less than 5 unit-times. This means that the cell loss rate criteria is more dominant than the average queuing delay. This is true because the performance objective associated with cell loss rate meets the estimated cell loss rate before the average queuing delay meets the criteria associated with average queuing delay.

Conventional routing methods do not take this behavior into account, because the link status is estimated through average queuing delay, or a function which is based only on the offered load.

Figure 4:
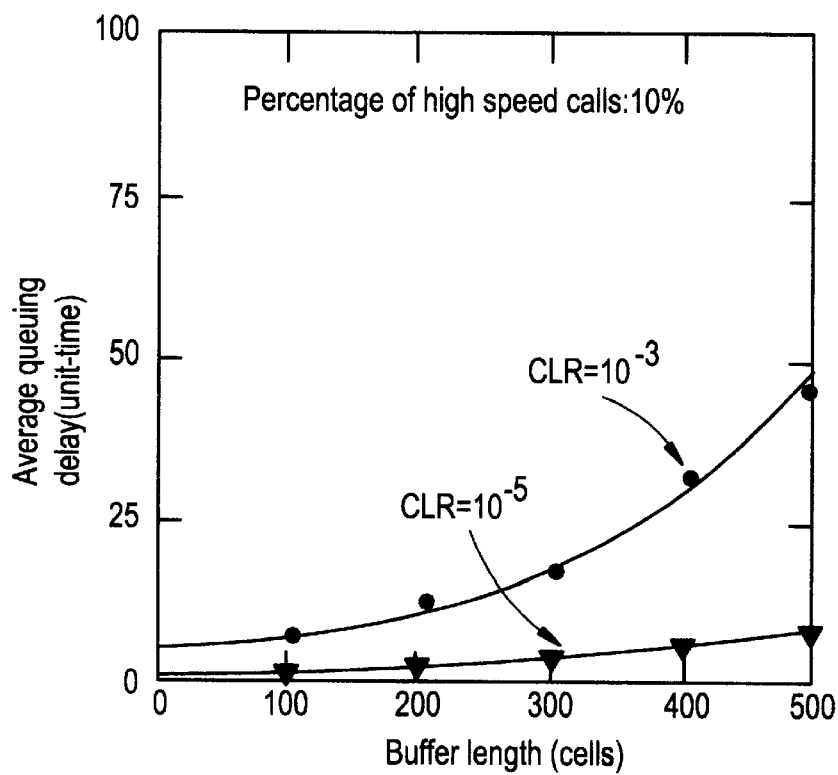
FIG. 4 shows the average queuing delay vs. the output buffer size in an ATM network in accordance with the present invention.

As shown, ATM traffic is more sensitive to cell loss rate than the queuing delay, when the buffer size is small, say a few hundred cells. Moreover, the cell loss rate and the queuing delay are not solely determined by the offered load. This is true up to at least 500 cells in the output buffer. FIG. 4 shows the average queuing delay vs. the output buffer size. Here, the percentage of high speed calls is 10%. High speed calls have $V_p = V/10$ and $V_a = V_p/10 = V/100$. Low speed calls have $V_p = V/100$ and $V_a = V_p/2 = V/200$. As shown in the FIG. 4, the average queuing delay is small, even when the output buffer size is 500 cells. When the required cell loss rate is $10^{-3}$ with a 500 cell output buffer, the average queuing delay is less than 50 unit-times. Here, 50 unit times corresponds to about 135 $\mu$sec with a 156 Mbps link and 53 bytes cells. (The 135 $\mu$sec corresponds to a propagation delay of the transmission link of about 41 Km). With $10^{-5}$, the average queuing delay is less than 10 unit-times, even with a 500 cell output buffer. Therefore, in order to achieve high network throughput in accordance with the invention, both the routing control method and the call admission control method are made cell loss sensitive, and the cell loss rate is estimated to accurately reflect the actual value. In section 2, the routing CLR sensitive method is disclosed in detail.

2. Routing Control Method 2.1 Routing in an ATM Network

In an ATM network, the cell loss rate and link delay are the main communication qualities which should be guaranteed by the network. The job of call admission control is to keep the network load moderate so as to guarantee these qualities by rejecting call set-up requests if necessary. Routing control is for selecting the best path for a given source/destination pair. With routing control, a call might be accepted that otherwise would have been blocked, because the "first choice" path was too highly loaded. Therefore, routing control can increase network throughout.

As mentioned in section 1, both the call admission control method and the routing control should be performed based on the cell loss rate. When the cell loss rate as estimated by call admission control along the selected path is larger than the required cell loss rate for the connection, the call set-up request is rejected. The routing method selects the path that has the smallest expected cell loss rate among the paths between the corresponding node pair. This approach is the same as conventional shortest path routing strategies (Ref. 9, especially Chapter 5, and Refs. 10–22) except that the cell loss rate is used as the governing criteria. In general, the selection of paths between a source and destination involves evaluating all of the possible paths (which are made up of links between network nodes). Each possible path may be termed a candidate path, and is evaluated from the point of view of a cost factor which, in accordance with the invention, is a function of the cell loss rate for each candidate path. The candidate path with the smallest cost factor is selected for the call, e.g., the path with the smallest cell loss rate or function of cell loss rate.

Another approach is finding the best paths which optimize a cost function of the network as a whole, rather than just the call under consideration. (Ref. 9). This approach finds the paths that maximize total network throughput while maintaining acceptable cell loss rate within the network. The optimizing algorithms require large amounts of calculation because of the complexity of the algorithms. Therefore, in accordance with a preferred embodiment of the invention, the less computer intensive approach is utilized which focuses on finding the smallest cell loss rate's path for a certain node pair—similar to the shortest path algorithms.

Each call is realized through a virtual connection in an ATM network, using virtual circuit routing. (See, for example, Ref. 9, p. 14 and chapter 5). All of the cells of a certain call are transferred along the same path, which is determined at call set-up through the routing control method. Therefore, the routing decision is call by call, not cell by cell.

ATM networks employ a call set-up procedure. In a call set-up request, each call conveys to the network the traffic parameters that the call would generate during the connection. These parameters (traffic descriptors) may include, for example, peak bit rate, average bit rate, ratio of peak bit rate to average bit rate and the maximum burst length of the call. (Here, the burst length is defined as the period when the cells are transferred periodically at the peak bit rate of the call, or the maximum number of cells that can be transferred by the call during a perdetermined period.) Each call also conveys source and destination addresses, and its required quality of service (QOS) associated with the call characterized by the cell loss rate and queuing delay. The network selects the best path for the corresponding source and destination node pair through the CLR sensitive routing control method. The network then determines whether to accept the call set-up request or not through the CLR sensitive admission control method for the selected path. When the evaluated cell loss rate is less than or equal to the required cell loss rate, the call set-up request is accepted.

When the call set-up request is accepted, the call can start to transfer the cells. During a connection, the call can not violate the traffic parameters which were conveyed to the network in the call set-up procedure. In an ATM network, the policing control insures that each call does not exceed the negotiated traffic parameters.

As described in section 1, in an ATM network, the cell loss rate is more sensitive to offered load than the average queuing delay. Moreover, the cell loss rate in an ATM network is much different from the cell loss rate that would be expected assuming a Poisson arrival process. For example, even when the average delay is still fairly small, the cell loss rate tends to be large, although both the cell loss rate and the average queuing delay estimated by assuming a Poisson arrival process tends to be small. The upper limit of the utilization efficiency of a certain communication resource, such as bandwidth, is mainly determined by the cell loss rate rather than by the queuing delay. Thus, again in accordance with the invention, call admission control in ATM networks should be cell loss rate sensitive. As a result, when the call set-up request is rejected, the average queuing delay is usually small. Therefore, the link delay in ATM networks is mainly caused by propagation delay.

In accordance with another aspect of the invention, the cell loss rate used by the routing control method should be based on cell loss estimates rather than cell loss measurements. This is true for the following two reasons.

First, the measuring of the cell loss rate is difficult in an ATM network. The required cell loss rate within the network is around $10^{-6}$ or $10^{-9}$. For example, when the bit rate of the multiplexed line is 156 Mbps, $10^{-9}$ corresponds to an expected cell loss rate of one cell every 45 minutes. Since, the required time for measuring of the cell loss rate would be so long, using the measured cell loss rate in routing control is impractical.

Second, ATM traffic fluctuates heavily and has uncertainty. In an ATM network, the cells from the calls are multiplexed statistically. Therefore, the multiplexed traffic fluctuates and the measured traffic parameters are not deterministic but statistical. Therefore, if the cost used in the routing method is obtained by measurements, it is impossible to guarantee that the selected path is the best.

For the above reasons, the proposed routing control method is performed using the evaluated cell loss rate as the cost function. The cell loss rate is evaluated in call admission control based on the negotiated traffic parameters. Call admission control guarantees that the cell loss rate requirements of each call are met. (Ref. 8).

2.2 Routing Control Method Using Smallest Cell Loss Rate

In this subsection, a routing control method is described in accordance with the principles of the invention. The path which shows the smallest cell loss rate is selected.

The CLR sensitive method is similar to shortest path routing, such as used in ARPANET or DNA (DEC's Digital Network Architecture) and may employ shortest path algorithm such as Bellman-Ford, Dijkstra, Floyd-Warshall etc. (See, Refs. 10–13, and especially Ref. 9, chapter 5 for an overview). Conventional shortest path algorithms use the total link delay, which is mainly specified by the queuing delay and the propagation delay, or by a static value, as the elements of a routing matrix. In the CLR sensitive routing method, the elements of the routing matrix are replaced by a cell loss rate value instead of the link delay or a static value. This means that the shortest path algorithm can take advantage of the conventional techniques that exist for finding the shortest path, by simply modifying the matrix element from link delay to cell loss rate, more precisely, the estimated value of the cell loss rate.

We define a connected graph, G=(N,L). N is the set of nodes in the graph, $\{n_i | 0 \le i < N\}$, and L is the set of links $\{l_{ij} | 0 \le i,j < N, i \ne j\}$. $l_{ij}$ represents the link from node i to node j. Here, N is the number of nodes within the network.

R is defined as the set of cell loss rates which is evaluated through call admission control, $R = \{r_{ij} | 0 \le i,j < N, i \ne j\}$. $r_{ij}$ represents the cell loss rate for the link from node i to node j. $P_{i,j,p}$ ($0 \le i,j < N$, $i \ne j$) is defined as the set of paths p from node i to node j, where a path p is a set of links—$\{l_{i,a}, l_{a,b}, l_{b,c} \ldots, l_{xj}\}$. $C_{i,j,p} = \{C_{i,j,p} | 0 \le i,j < N, i \ne j\}$ is the set of costs for paths p.

$$c_{i,j,p} = \sum_{l_{s,t} \in p} r_{i,j} \qquad (1)$$

$$= r_{i,a} + r_{a,b} + r_{b,c} + \ldots + r_{x,j}$$

Using $C_{i,j,p}$, the path which shows the smallest expected cell loss rate is chosen as the best path $P_{min}$.

$$C_{i,j,Pmin} = \min\{C_{i,j,p} | p \in P_{i,j}\} \qquad (2)$$

Here, in eq. (1), in order to obtain $c_{i,j,p}$, $r_{s,t}$ are added along the path p. Strictly speaking, the procedure of eq. (1) should not be addition. However, the cell loss rates $r_{s,t}$ are much smaller than 1.0. Therefore, we can use the added value as the approximate value, shown in eq. (3).

$$c_{i,j,p} = 1.0 - \prod_{l_{s,t} \in p} (1.0 - r_{s,t}) \qquad (3)$$

$$\simeq 1.0 - \left(1.0 - \sum_{l_{s,t} \in p} r_{s,t}\right)$$

$$= \sum_{l_{s,t} \in p} r_{s,t}$$

3. Performance Evaluation

In this section, the performance of the CLR sensitive method is evaluated. The performance of the CLR sensitive method is compared with the performance of the delay sensitive and the queuing sensitive methods. In the performance evaluation, the ideal case, where the routing tables are updated whenever a call set-up occurs, is considered. In the more practical case, updating occurs less frequently and consideration should be given to the trade-offs of frequent updating vs. overhead.

3.1 Performance Evaluation Model 3.1.1 Evaluation Model

Figure 5:
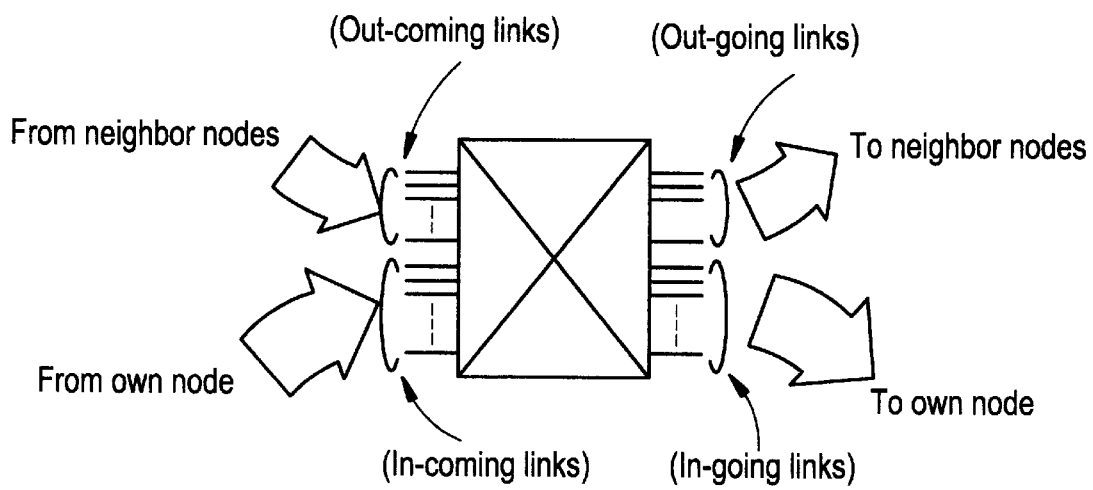
FIG. 5 shows the performance evaluation model and the switch model for each node in accordance with the present invention.

FIG. 5 shows the switch model for each node. Node i has an $M_i \times M_i$ switch. The switch has $m_i$ input ports and $m_i$ output ports which are connected to the neighbor nodes. The $m_i$ input ports correspond to the multiplexed lines which transfer the cells from the neighbor nodes to node i: the ports for out-coming links. And $m_i$ output ports correspond to the multiplexed lines which transfer the cells from node i to neighbor nodes: the ports for out-going links. $(M_i - m_i)$ input ports and $(M_i - m_i)$ output ports are connected to endpoints. $(M_i - m_i)$ input ports correspond to the multiplexed lines which transfer the cells from the endpoints: the ports for in-coming links. And $(M_i - m_i)$ output ports correspond to the multiplexed lines which transfer the cells to endpoints: the ports for in-going links.

Intermediate nodes transfer cells over their out-going links, and destination nodes transfer cells over their in-going links.

The cell loss rate is estimated assuming a bufferless multiplexer model. An $M_i \times M_i$ switch is modeled as $M_i$ of $M_i \times 1$ multiplexers. The cell loss rate of each port in the switch is obtained using the negotiated peak bit rate and the average bit rate of each call. See, for example, Ref. 8.

Figure 6:
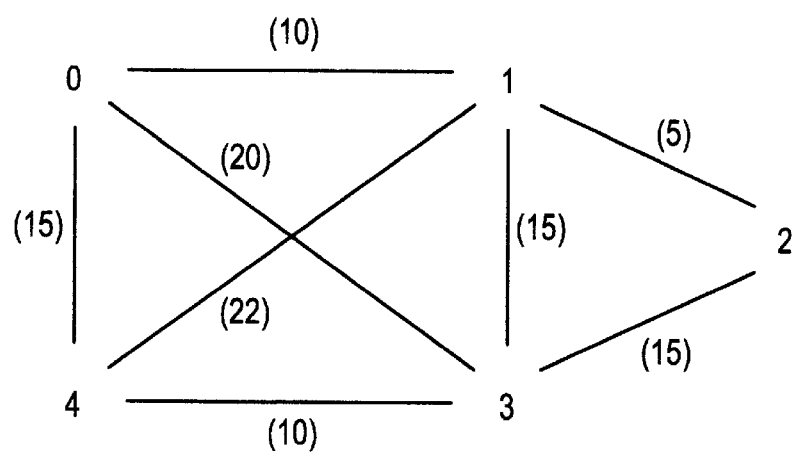
FIG. 6 shows the performance evaluation model and the evaluated network in accordance with the present invention.

FIG. 6 shows the evaluated network. There are 5 nodes in the network and each link has the same bandwidth. The relative distance of the link is shown in parentheses beside the corresponding link. With the delay sensitive method, the cost function of routing is obtained by the summation of this distance and $10\rho/(1-\rho)$, where 10 is the coefficient of the cost function $\rho/(1-\rho)$. When the number of out-going links is m, the number of input and output ports of the switch is 2 m (ie., (2 m)×(2 m) switch). m ports are connected to the neighbor nodes, and another m ports are connected to endpoints. For example, for node 1, the number of out-going links is 4, and the switch within this node is 8×8. In order to prevent a bottleneck at the in-going links, one makes the number of in-going links at least the same as the number of in-coming links.

In accordance with the invention, since the call admission control method is cell loss sensitive, when the cell loss rate evaluated by call admission control is larger than the required cell loss rate within the network, the call set-up request is rejected.

The performance of the routing methods is evaluated as the throughput of the network when the first rejection of call set-up request occurs. In the performance evaluation, no call releasing occurs: only call set-up events occur. Therefore, the throughput of the network increases monotonically. When a certain multiplexed line along the selected path can not guarantee the required cell loss rate, the call's set-up request is rejected. The better the routing method, the larger is the throughput at the first call set-up request's rejection. Therefore, the throughput when a first rejection of a call set-up request occurs can be used as a measurement value for the performance of the routing control method.

As before, the performance is evaluated through computer simulation. The call set-up request is rejected when the cell loss rate estimated through the call admission control is larger than $10^{-6}$.

3.1.2 CLR Sensitive Method

Q is defined as the set of cell loss rates which are evaluated in call admission control, $Q=\{q_{i,s}|0\leq i<N, s\in$ in-going links). $q_{i,s}$ represents the cell loss rate for in-going links s in node i. $H_i(0\leq i<N)$ are defined as the routing tables for node i, in order to select the best in-going link, $\{h_{i,s}|0\leq i<N, s\in$ in-going links$\}$.

The out-going link that should be chosen as the best path from node i to node j is determined through $C_{i,j,p}$, which is defined in the previous section. The path which shows the smallest cell loss rate is chosen as the best path for a certain destination node j. Each node, e.g., the source and intermediate nodes, determines the neighbor node that the cell should be transferred to, such that the expected cell loss rate is the smallest.

At the destination node, the port for the in-going link which is expected to yield the smallest cell loss rate is chosen using routing table $H_i$.

3.1.3 Comparison Method and Performance Measurement

[1] Delay Sensitive Method

The delay sensitive algorithm is for finding a path so as to minimize the expected average link delay. There are two types of delay sensitive routing algorithms. One is the static, delay sensitive (static), and the other is dynamic, delay sensitive (dynamic).

In the static routing method, the path is determined by the propagation delay in the network. The path which has the smallest propagation delay is defined as the best path for a certain node pair.

In the dynamic routing method, link delay is determined by the summation of the propagation delay and the queuing delay since the other delay factors are negligible. Usually, $\rho/(1-\rho)$ is used as the cost function for the queuing delay. Therefore, the dynamic delay sensitive method is realized through an easy modification of the CLR sensitive method: the cost function, cell loss rate, is replaced by the summation of $\rho(1-\rho)$ and the propagation delay of the corresponding link.

[2] Queuing Sensitive Method

The queuing sensitive algorithm is for finding a path so as to minimize the expected average queuing delay. Therefore, this method is essentially the dynamic delay sensitive method, assuming that the propagation delay is zero.

3.2 Multiplexing High Speed Calls and Low Speed Calls

In this subsection, the performance, with both high speed and low speed calls, is evaluated. The high speed calls have $V_p=V/15$ and $V_a=V_p/100$. The low speed calls have $V_p=V/150$ and $V_a=V_p/2$.

Figure 7:
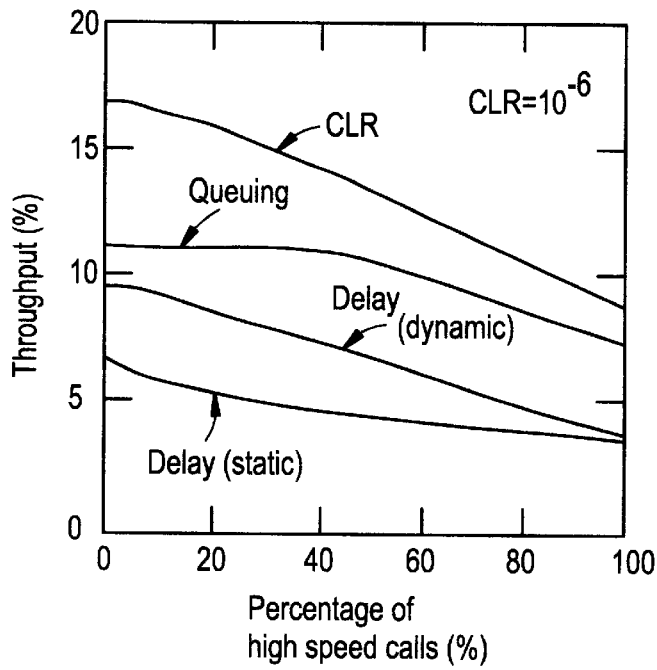
FIG. 7 shows the network throughput at the first call set-up request's rejection in multiplexing high-speed calls and low-speed calls in accordance with the present invention.

FIG. 7 shows the network throughput at the first call set-up request's rejection, when there are two source and destination pairs: (source node, destination node)=(0,4) and (1,3). See also FIG. 6. Here, the number of calls for each source destination pair is the same. On the (0,4) pair, 90% of calls are high speed calls and 10% of calls are low speed calls. On the (1,3) pair, x% of calls are high speed calls and (100-x)% of calls are low speed calls. The horizontal axis is the percentage of high speed calls on the (1,3) pair. The vertical axis is the network throughput when first rejection for the call set-up request occurs.

As shown in this figure, the CLR sensitive method shows better performance than the other methods. The conventional methods use propagation delay and/or queuing delay as the cost function within the routing algorithms. As mentioned in section 1, the cell loss rate grows large at lower offered load, even though the average queuing delay is fairly small. Therefore, the conventional method yields less throughput.

Figure 8:
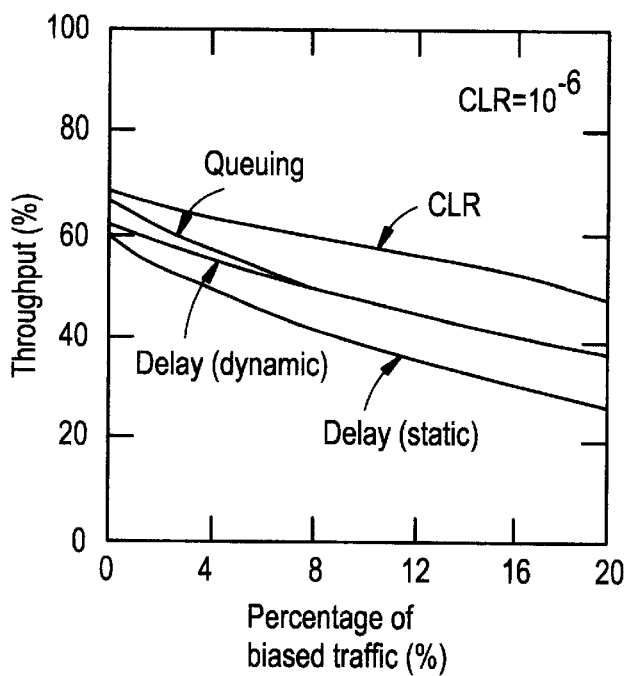
FIG. 8 shows the network throughput at the first call set-up request's rejection, when there is random traffic (homogeneous) and biased (heterogeneous) traffic in multiplexing high-speed calls and low-speed calls in accordance with the present invention.

FIG. 8 shows the network throughput at the first call set-up request's rejection, when there is random traffic (homogeneous) and biased (heterogeneous) traffic. The random traffic has random source nodes and random destination nodes. In the random traffic, 10% of calls are high speed and 90% of calls are low speed. Here, the load offered by each node is proportional to the size of switch within the corresponding node. For example, 3/16 of random traffic is from node 0, because the total number of out-going links within the network is 16 and the number of out-going links for node 0 is 3. The biased traffic is (0,4) and (1,3). The calls on the (0,4) pair are only high speed calls, and the calls in the (1,3) pair are only low speed calls. The evaluation is performed changing the percentage of biased traffic. For example, when the percentage of biased traffic is 20%, 10% of calls are (0,4), 10% of calls are (3,4) and 80% of calls are random traffic.

Once again, the CLR sensitive method shows the best performance among the comparing methods.

4. Discussion

In this section, the reason why the CLR sensitive routing control method shows better performance than the other methods is described.

Figure 9:
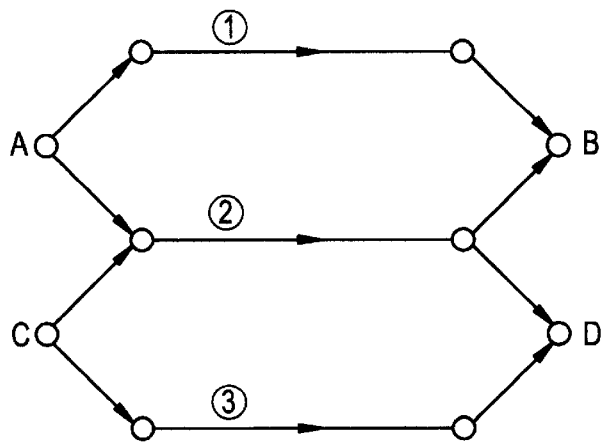
FIG. 9 shows a simple network model in multiplexing high-speed calls and low-speed calls in accordance with the present invention.

To see why, consider the simple network model shown in FIG. 9. There are 4 nodes, A,B,C, and D. Cells are transferred from node A to node B and from node C to node D. The cells form A to B are transferred through the links 1 and 2. The cells from C to D are transferred through the links 2 and 3. Therefore, link 2 is shared between the cell flows of A to B and C to D.

4.1 Multiplexing High Speed Calls and Low Speed Calls

Consider the case where the percentage of high speed calls between node A and B is larger than the percentage between node C and D.

FIG. 10 shows the characteristics of the cell loss rate and $\rho(1-\rho)$ on the three links, when CLR sensitive routing and queuing sensitive routing are performed.

Figure 10A:
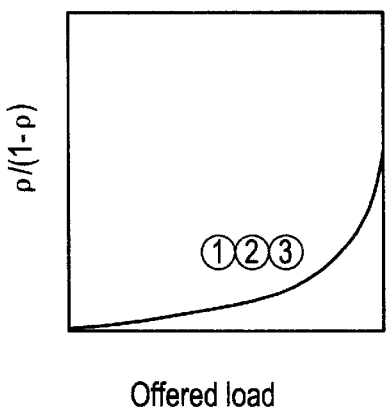
FIGS. 10($a$)–($d$) show the characteristics of the cell loss rate and $\rho/(1-\rho)$ on the three links, when CLR sensitive routing and queuing sensitive routing are performed in multiplexing high-speed calls and low-speed calls in accordance with the present invention.
Figure 10B:
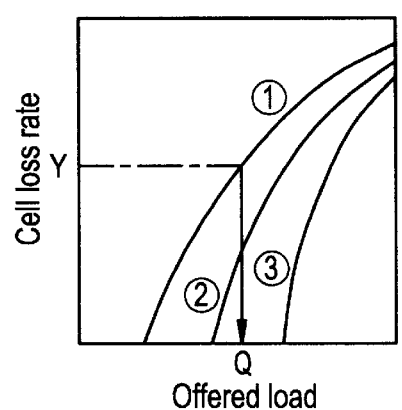

In the queuing sensitive method of FIGS. 10(a) and 10(b), the path is selected so that the offered loads of the three links are the same. In terms of the percentage of high speed calls, link 1 has the largest percentage of high speed calls. Link 3 has the smallest percentage of high speed calls. As mentioned in section 1, when the percentage of high speed calls changes, the characteristics of cell loss rate changes also. The cell loss rate characteristics of these three links are shown FIG. 10(b). At the same offered load, the cell loss rate of link 1 is the largest. Therefore, when Y is the cell loss rate requirement, the maximum offered load Q is determined by link 1.

Figure 11:
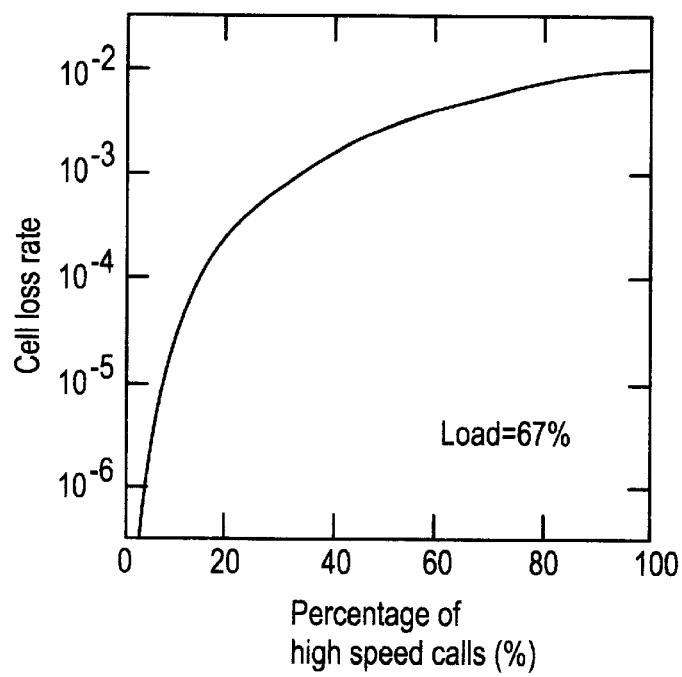
FIG. 11 shows the cell loss rate vs. the percentage of high speed calls when the offered load is constant in multiplexing high-speed calls and low-speed calls in accordance with the present invention.

FIG. 11 shows the cell loss rate vs. the percentage of high speed calls when the offered load is constant. Here, high speed calls have $V_{p1}=V/15$, $V_{a1}=V_{p1}/100$ and low speed calls have $V_{p2}=V/150$, $V_{a2}=V_{p2}/2$. As shown in this figure, the cell loss rate increases with the percentage of high speed calls. This means that even though links 2 and 3 can accept more calls, the paths through link 2 or 3 are not chosen in the queuing sensitive method.

Figure 10C:
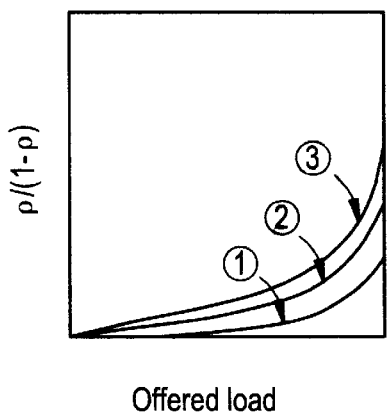
Figure 10D:
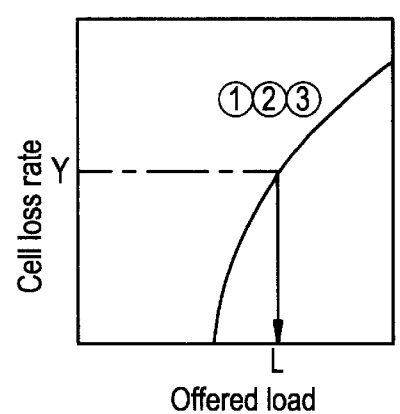

FIGS. 10(c) and 10(d) show the case of the CLR sensitive method. The path is selected so that the cell loss rate of each link is the same, as shown FIG. 10(d). Therefore, the offered loads for each link are not the same, as shown in FIG. 10(c). Link 3 can accept a higher load than link 1 or link 2, because of the low percentage of high speed calls on the link. The offered load of link 3 is larger than the load of link 1 or link 2.

Figure 12:
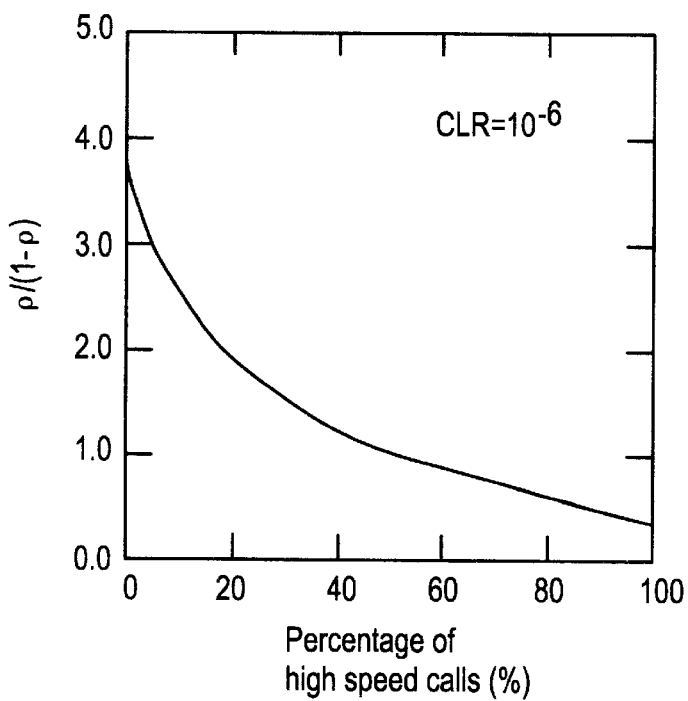
FIG. 12 shows the ρ/(1-ρ) vs. the percentage of high speed calls, when the cell loss rate is constant in multiplexing high-speed calls and low-speed calls in accordance with the present invention.

FIG. 12 shows the $\rho/(1-\rho)$ vs. the percentage of high speed calls, when the cell loss rate is constant. As shown in the figure, $\rho/(1-\rho)$ decreases with the percentage of high speed calls. Here, $\rho/(1-\rho)$ increases monotonically with the offered load. In the CLR sensitive method, the offered load of the link that has a high percentage of high speed calls, is lower than the load of the link that has a low percentage of high speed calls. As a result, the maximum acceptable load for the network using the CLR sensitive method is larger than the acceptable load using the queuing sensitive method.

Figure 13:
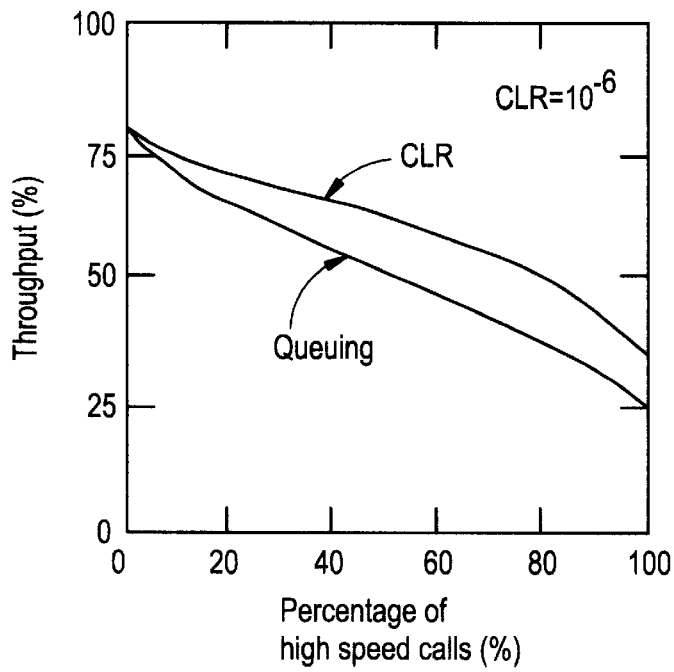
FIG. 13 shows the throughput of the network shown in FIG. 9, when the offered loads for node A to B and for C to D are the same in multiplexing high-speed calls and low-speed calls in accordance with the present invention.
Figure 14:
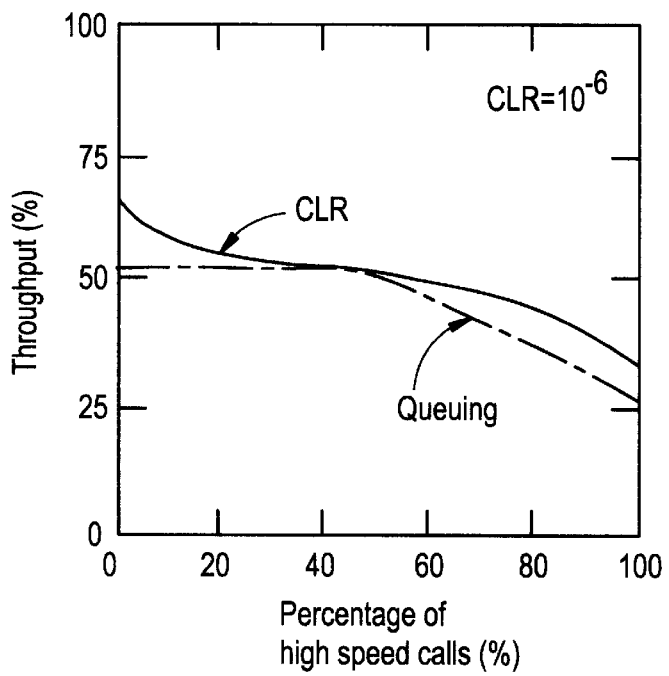
FIG. 14 shows the throughput of the network shown in FIG. 9, when the offered loads for node A to B and for C to D are the same in multiplexing high-speed calls and low-speed calls in accordance with the present invention.

FIGS. 13 and 14 show the throughput of the network shown in FIG. 9, when the offered loads for node A to B and for C to D are the same. The horizontal axes are the percentage of high speed calls between node A and node B. In FIG. 13, the percentage of high speed calls between node C and node D is 0%: all calls are low speed calls. In FIG. 14, the percentage of high speed calls between node C and D is 50%. Here, the high speed calls have $V_{p1}=V/15$, $V_{a1}=V_{p1}/100=V/1500$, and the low speed calls have $V_{p2}=V/150$, $V_{a2}=V_{p2}/2=V/300$. As shown in these figures, the acceptable offered load for this network using the CLR sensitive method is larger than the offered load using the queuing sensitive method.

In FIG. 14, the acceptable offered load for the queuing sensitive method is constant, when the percentage of high speed calls is smaller than 50%. A similar phenomenon occurs in FIG. 7. When the percentage of high speed calls on A to B is 50%, the percentage of high speed calls in the three links are exactly the same. Then, the cell loss rate characteristics for each links is also exactly the same. Therefore, the acceptable offered load for the CLR sensitive and the queuing sensitive method is the same. When the percentage of high speed calls on A to B is smaller than the percentage on C to D, the acceptable offered load is determined by the cell loss rate characteristics of link 3 since link 3 has the largest cell loss rate among the three links at the same offered load. When the percentage of high speed calls on A to B is smaller than the percentage on C to D, link 3 always has the largest cell loss rate among the three links. Even though the percentage of high speed calls on A to B changes, the percentage on C to D does not change. As a result, the acceptable offered load does not change, even when the percentage of high speed calls on A to B changes.

5. Modified Routing Control Method

As shown in the evaluation of ATM traffic characteristics, the propagation delay is the dominant factor of the link delay. There is a requirement of an upper limit for the link delay, as well as the requirement for an acceptable cell loss rate.

Therefore, the set of candidated paths $P'_{i,j}$, corresponding to the call set-up request from node i to node j associated with a cell loss rate is selected from $P_{i,j}$. $P'_{i,j}$ is the subset of $P_{i,j}$.

The path of $P'_{i,j}$ has a smaller propagation delay than $D_{max}(i,j)$. Here $D_{max}(i,j)$ is the maximum allowable propagation delay of the path from node i to node j. It may be defined by the user or network in connection with the QOS requirements.

The algorithm is as follows:

(1) Choose the set of paths, $P'_{i,j}$, from $P_{i,j}$ $P_{i,j}$ is the set of possible paths from node i to node j $$P'_{i,j}=\{p|d_{i,j,p} \leq D_{max}(i,j), p \in P_{i,j}\}$$

here, $d_{i,j,p}$ is the propagation delay on path p which is one of the paths from node i to node j.

(2) Choose the path $p_{min}$ whose expected cell loss rate is the smallest within $P'_{i,j}$ $$C_{i,j,Pmin}=\min\{C_{i,j,p}|p \in P'_{i,j}\}$$

6. Call Admission Control 6.1 Introduction

An ATM network is one method for realizing a flexible and cost-effective network for handling a wide variety of communications. In ATM networks, multiplexed traffic load fluctuates heavily and rapidly, especially when high speed calls are multiplexed. (Refs. 1, 23, 24). Congestion control is one of the major problems in an ATM network. (Refs. 4 and 5). When congestion occurs, the buffer queue grows so long that some cells are discarded due to the buffer overflow. The objective of congestion control is to make the network satisfy user requirements for communication quality, as specified by cell loss rate and link delay.

There are two levels of congestion control in an ATM network. One is control at the cell transmission level. (Ref. 19). The other is control at the call set-up level, referred to as a call admission control. (Refs. 2, 3, 6, 7, 20, 25 and 26).

Congestion control at the cell transmission level, such as priority control or flow control methods, is carried out after call set-up in order to prevent unacceptable cell loss.

Call admission control maintains the network load at an adequate level, in order to guarantee each user's requirements for quality of service. Since various kinds of traffic are multiplexed in an ATM network, it is necessary to evaluate the expected cell loss rate in order to achieve effective call admission control. Moreover, even in the multi-media case, call admission control must be performed in real time.

6.2 Requirements for a Call Admission Control Method

Call admission control determines whether to accept a call or not when a call set-up request occurs so as to guarantee user requirements for communication quality. The call admission control method in accordance with the invention focuses on satisfying user requirement for the cell loss rate.

The requirements which a call admission control method must provide are as follows:

(1) real time response: determine in real time whether to accept a call or not when a call set-up request occurs;

(2) safety margin: evaluate a cell loss rate which is larger than the potential value, so as to have a safety margin;

(3) policing: monitor whether the traffic for each call violates the negotiated traffic parameters;

(4) applicability of multi-media case: operate even when many kinds of calls are multiplexed; and (5) high utilization efficiency: use the multiplexed line at high efficiency by taking account of statistical multiplexing.

The call admission control methods in accordance with the invention provide for these requirements. The real time requirement can be fulfilled through reducing the amount of calculation in evaluation cell loss rate, because a large part of the calculation in call admission control concerns evaluating cell loss rate. Using recursive equations and using probability functions for the number of cells which are transferred from multiplexed calls in evaluating cell loss rate, the amount of calculation in call admission control can be reduced dramatically. The safety requirement can be fulfilled through defining peak bit rate and average bit rate as the negotiating traffic parameters within the network. The requirement for applicability of multi-media case can be fulfilled also by using recursive equations and probability functions in evaluating cell loss rate. Using these two techniques, the amount of calculation in estimating cell loss rate does not increase in multi-media case. Finally, the inventive call admission control method can fairly estimate the statistical multiplexing effect.

Call admission control is performed based on the evaluated cell loss rate assuming a new call would be established or a call would be released. In other words, when the estimate cell loss rate is larger than the required cell loss rate, the call set-up request is rejected. Therefore, in the following section, the evaluation methods are described for cell loss rate when a cell is established or released.

6.3 Call Admission Control Method without Priority Control 6.3.1 Fundamental Method In this section, the fundamental evaluation method for cell loss rate is described.

One unit-time is defined as the time that the multiplexer or switch can transfer one cell to the multiplexed line. The peak bit rate of the call, whose peak bit rate is largest among the multiplexed calls, is defined as $V_{p0}$(cells/unit-time). The period T is defined as the inverse of $V_{p0}$. $M_T$, which is numerically equal to T, is defined as the number of cells which can be transferred to the multiplexed line in time T. However, no call can transfer more than one cell to the multiplexer during T.

It is assumed that, when the number of cells which are transferred from calls is larger than $M_T$(cells), the number of cells beyond $M_T$(cells) is discarded. Assuming this bufferless model, the fundamental evaluation method estimates a safety cell loss rate which is larger than the value for real multiplexing system. L kinds of calls are multiplexed. The number of calls type j ($1 \leq j \leq L$) is $N_j$; the number of activated calls is $n_j$; the peak bit rate is $V_{pj}$; average bit rate is $V_{aj}$; and the bit rate of the multiplexed line is V.

Cell loss rate, CLR, is give by eq. (4) below. Here, P(k) means the probability the k cells are transferred from multiplexed calls during period T.

$$CLR = \frac{1}{\rho M_T} \sum_{k=M_T+1}^{\infty} (k - M_T)P(k) \qquad (4)$$

where, $$P(k) = \sum_{k=n_1+n_2+\ldots n_L} \prod_{j=0}^{L} \binom{N_j}{n_j} \alpha_j^{n_j}(1 - \alpha_j)^{N_j-n_j}$$

$$\alpha_j = V_{aj}/V_{pj}, \quad \rho = \sum_{j=1}^{L} N_j V_{aj}/V$$

$\rho$ is the offered load, $0 \leq \rho \leq 1$. Eq. (4) can be transformed as eq. (5). Throughout this transformation, the amount of summation is reduced from $[M_T+1, \infty]$ to $[0, M_T]$.

$$CLR = \frac{1}{\rho M_T} \sum_{k=0}^{M_T} (M_T - k)P(k) + 1 - \frac{1}{\rho} \qquad (5)$$

When one call, type j, is newly established, the new cell loss rate, CLR', is given as follows. Here, {P(k)} is updated using the recursive equations.

$$CLR' = \frac{1}{\rho' M_T} \sum_{k=0}^{M_T} (M_T - k)P'(k) + 1 - \frac{1}{\rho'} \qquad (6)$$

$$P'(k) = \begin{cases} (1 - \alpha_j)P(0) & (k = 0) \\ (1 - \alpha_j)P(k) + \alpha_j P(k-1) & (1 \leq k \leq M_T) \end{cases} \qquad (7)$$

where, $$\rho' = \rho + V_{aj}/V \alpha_j = V_{aj}/V_{pj}$$

When one call type j is newly established, CLR can be obtained by eq. (6), and $P(k)(0 \leq k \leq M_T)$ are updated with eq. (7). The amount of calculation for each equation is only of order T.

Moreover, when one call, type j, is released, CLR' and P' $(k)(0 \leq k \leq M_T)$ are given by eq. (8) and eq. (9).

$$CLR' = \frac{1}{\rho' M_T} \sum_{k=0}^{M_T} (M_T - k)P'(k) + 1 - \frac{1}{\rho'} \qquad (8)$$

$$P'(k) = \begin{cases} P(0)/(1 - \alpha_j) & (k = 0) \\ (P(k) - \alpha_j P(k-1))/(1 - \alpha_j) & (1 \leq k \leq M_T) \end{cases} \qquad (9)$$

where, $$\rho' = \rho - V_{aj}/V \alpha_j = V_{aj}/V_{pj}$$

As a result, the amount of calculation for the call release equation is of order T.

With conventional methods, when one call is newly established or one call is released, the amount of calculation for evaluating the new cell loss rate is on the order of $L^L$, where L is the number of kinds of multiplexed calls [13]. However, through this fundamental method, the amount of calculation for evaluating the new cell loss rate is the order of T and is independent of L.

Figure 15:
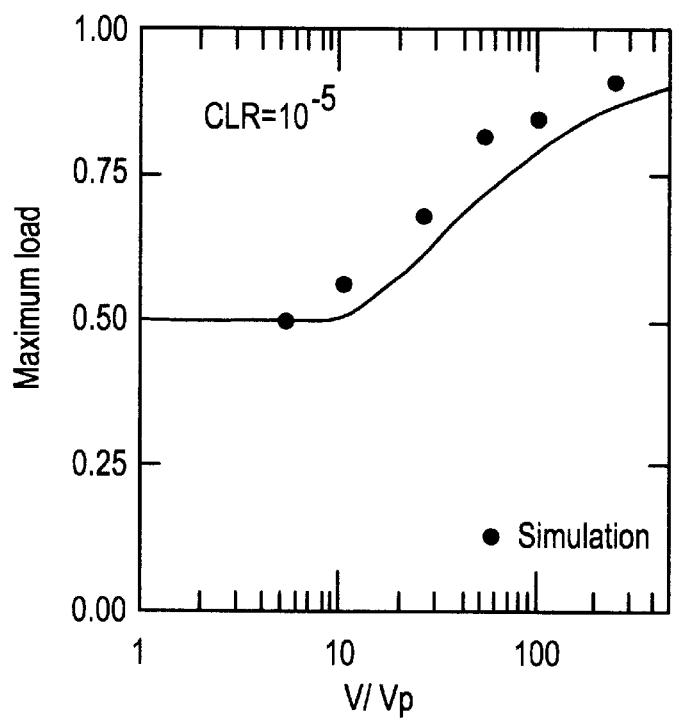
FIG. 15 shows the fundamental evaluation method for cell loss rate and effect of statistical multiplexing when identical calls are multiplexed in accordance with the present invention.

FIG. 15 shows the effect of statistical multiplexing when identical calls are multiplexed. Through this fundamental method, the effect of statistical multiplexing can be estimated. The required cell loss rate is smaller than or equal to $10^{-5}$. In the figure, $V_p$ is the peak bit rate parameter, V is the bit rate of the multiplexed line, and $V_a = V_p/2$. The simulation assumes an output buffer type multiplexer, a buffer size of 100 cells, and an average length of 100 cells for each of the active and idle states of a 2-state Markov chain.

As for the analysis of the fundamental method, each call is modeled as transferring cells at the speed of $V_{p0}$, the maximum peak bit rate among the multiplexed calls. Therefore, since most calls may have a peak bit rate less than $V_{p0}$, the cell loss rate evaluated through this fundamental method is too large compared with the real value. In some cases, the summation of the peak bit rate for each call is smaller than the bit rate for the multiplexed line. In the following section, a more realistic method, denominated an "individual peak rate" method, is described.

6.3.2 Individual Peak Rate Method $N_j$ calls of type j can transfer exactly $N_j$ calls during period $1/V_{pj}(=T_j)$ at the speed of their peak bit rate $V_{pj}$. Accordingly, $N_j$ calls of type j transfer $N_jT/T_j$ cells during period T. Since the call whose peak bit rate is $V_{p0}$($V_{p0}>V_{pk}$ for any k) transfers exactly one cell during T, $N_j$ calls of type j can be considered as equivalent to $N_jT/T_j(=N_jV_{pj}/V_{p0})$ calls each of whose peak bit rate is $V_{p0}$. With this procedure, a call of type j is no longer modeled as transferring cells at the speed of $V_{p0}$, but rather at the speed of $V_{pj}$. By applying this procedure to the fundamental method, the allowable maximum load can be increased.

However, $N_jV_{pj}/V_{p0}$ is not always an integer, so the cell loss rate is evaluated by the weighted average between the case of $[N_jV_{pj}/V_{p0}]$ and $[N_jV_{pj}/V_{p0}]+1$. Here, [x] means the largest integer that is not beyond x. Where, the weighting parameter is $a_{j0}$ for $[N_jV_{pj}/V_{p0}]$, is $a_{j1}$ for $[N_jV_{pj}/V_{v0}]+1$.

$$\begin{cases} a_{j0} = [N_jV_{pj}/V_{p0}] + 1 - N_jV_{pj}/V_{p0} \\ a_{j1} = 1 - a_{j0} \end{cases}$$

When the number of kinds of multiplexed calls is L, the amount of calculation for the weighted average is of order $2^L$. However, when one call type j is newly established or released, only one pair of weighted parameters, $a_{j0}$ and $a_{j1}$, change. Therefore, the amount of calculating for this weighted average can be reduced to order T (See Appendix).

6.3.3 Bandwidth Separation Method: METHOD1

Figure 16:
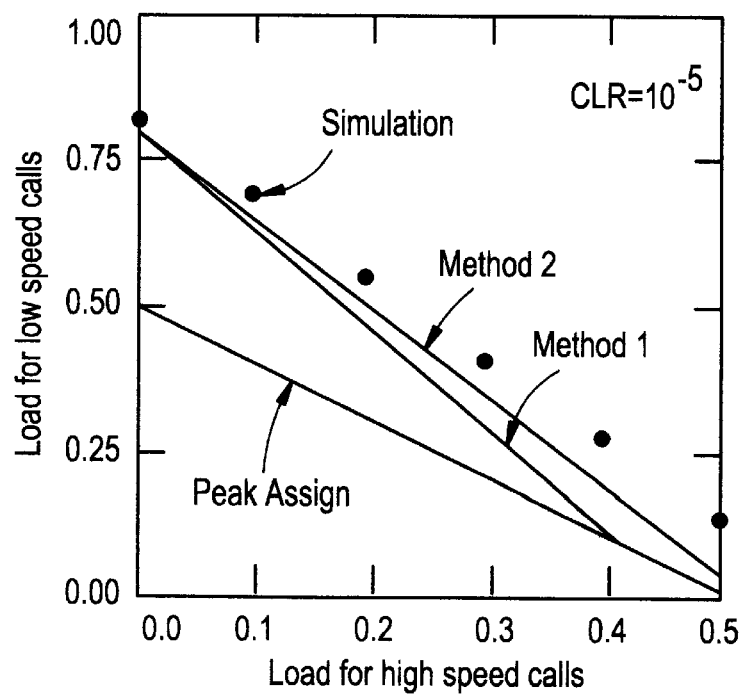
FIG. 16 shows results of a performance evaluation without priority control and the load for high speed calls vs. the maximum load for low speed calls when the cell loss rate for each call is smaller than or equal to $10^{-5}$ in accordance with the present invention.

The beneficial effect of statistical multiplexing falls off with increase of peak bit rate. The proposed fundamental method can estimate this behavior as shown in FIG. 16. In the analysis of the individual peak rate method, $N_j$ low speed calls are modeled as $[N_jT/T_j]$ calls whose peak bit rate is $V_{p0}$. Therefore, each call is modeled as transferring cells at its own peak bit rate $V_{pj}$. However, the statistical multiplexing effect of these low speed calls, which are modeled as high speed calls, is estimated through the statistical multiplexing effect of high speed calls: the benefit of statistical multipexing for high speed calls is smaller than for low speed calls. Therefore, when there is a great difference among the $V_{pj}$'s, the estimated effect of statistical multiplexing for low speed calls is underestimated in the individual peak rate method.

In order to take into account the effect of statistical multiplexing, in accordance with METHOD1, the bandwidth of the multiplexed line is separated physically and logically into plural exclusive sub-bandwidth's—for high speed calls and for low speed calls. Calls in a particular class specified by the peak bit rate, are accommodated into the corresponding sub-bandwidth. In a given sub-bandwidth, the inverse of the peak bit rate of the calls, whose peak bit rate is largest among the calls multiplexed into the corresponding sub-bandwidth, is the important parameter for the proposed method.

The performance of this method depends on how the multiplexed line bandwidth are separated and on how the multiplexed calls are classified. Based on the evaluation of the statistical multiplexing effect, the criteria of separation between high speed and low speed calls might be around BR=0.01 to BR=0.005, where BR is the relative peak bit rate of the calls compared to the multiplexed line.

6.3.4 Probability Function Method: METHOD2

METHOD1 does not take into account the statistical multiplexing effect between sub-bandwidths's—between high speed calls and low speed calls. METHOD2, however, accounts for this effect.

$T_1(=1/V_{p1})$ is defined as the inverse of the peak bit rate for the call whose peak bit rate is the maximum value among the low speed calls. Here, a low speed call is defined as one whose peak bit rate is smaller than $V_{p1}$. The multiplexed line can transfer $M_{T^1}$ cells during period $T_1$, where $M_{T^1}$ is numerically equal to $T_1$.

Therefore, it is assumed that, when the number of cells which are transferred from high speed and low speed calls are larger than $M_{T^1}$ (cells), the number of cells beyond $M_{T^1}$ (cells) are discarded. In order to evaluate the cell loss rate for this bufferless model, we have to obtain the probability density function for the number of transferred cells from the multiplexed calls during $T_1$. The probability G(n) that n cells are transferred from the multiplexed calls during $T_1$ is obtained by eq. (10). Here, F(k) is the probability that k cells are transferred from high speed calls during $T_1$. P(n-k), which is given by eq. (4), is the probability that (n-k) cells are transferred from low speed calls during $T_1$.

When G(n) is obtained, the cell loss rate is given by eq. (11).

$$G(n) = \sum_{k=0}^{n} F(k)P(n-k) \quad (0 \le n \le M_{T_1}) \tag{10}$$

$$CLR = \frac{1}{\rho M_{T_1}} \sum_{n=M_{T_1}+1}^{\infty} (n - M_{T_1})G(n) \tag{11}$$

Eq. (11) is transformed as eq. (12), reducing the summation from $[M_{T^1}+1, \infty]$ to $[0, M_{T^1}]$.

$$CLR = \frac{1}{\rho M_{T_1}} \sum_{n=0}^{M_{T_1}} (M_{T_1} - n)G(n) - \frac{1-\rho}{\rho} \tag{12}$$

In order to evaluate the cell loss rate, the probability density function {F(n)} must be obtained. F(n) is the probability that n cells are transferred from high speed calls. If F(n) represents the worst case cell transferring pattern, the evaluated cell loss rate is surely larger than the real cell loss rate.

It can be assumed that each call keeps its peak bit rate and average bit rate when policing control is enforced. The worst case cell transferring pattern is where a high speed call transfers cells continuously at the speed of its peak bit rate $V_{pj}$. Since each call keeps its average bit rate $V_{aj}$, the probability that a call type j transfers with the worst case pattern is $V_{aj}/V_{pj}$.

The worst case for F(n) mentioned above is given by eq. (13). Here, $Q_k(n_k)$ is the probability that $n_k$ cells are transferred from type k calls during $T_1$, and $N_k$ is the number of calls of type k($1 \le k \le L$).

$$F(n) = \sum_{n=n_1+n_2+\ldots+n_L}^{P} \prod_{k=1}^{L} Q_k(n_k) \tag{13}$$

where,

-continued $$Q_k(n_k) = \begin{cases} \binom{N_k}{l} \alpha_k^l(1-\alpha_k)^{N_k-l} & (n_k = 1\lfloor V_{pk}T_1 \rfloor) \\ 0 & \text{(others)} \end{cases}$$

Here $\lfloor x \rfloor$ means the smallest integer equal to or greater than x.

Through the following recursive equations, the calculation for F(n) is on the order of $T_1$. When one call type j is newly established, the new probability function F'(n) is given by eq. (14). Here, F(n) is the probability density function before a new call is established.

$$F'(n) = (1-\alpha_j)F(n) + \alpha_j F(n-m_j) \tag{14}$$

where, $$m_j = \lfloor V_{pj}T_1 \rfloor$$

Moreover, when one call of type j is released, F'(n) is given as eq. (15).

$$F'(n) = \begin{cases} \dfrac{1}{1-\alpha_j}[F(n) - \alpha_j F(n-m_j)] & (1 \leq n \leq M_{T_1}) \\ \dfrac{1}{1-\alpha_j}F(0) & (n = 0) \end{cases} \tag{15}$$

As a result, the amount of calculation for obtaining a new $\{P(k)\}$ and for obtaining new $\{F(n)\}$ is only on the order of $T_1$ when a new call is established or a call is released. This means that the calculation for evaluating the cell loss rate is of order $T_1^2$.

6.4 Call Admission Control Method with Priority Control: METHOD3

The previously described call admission control methods, as exemplified by equations (1)–(15), are similar to those described in Ref.(8) and in copending application Ser. No. 07/511,424, filed Apr. 19, 1990 entitled "Packet Network with Communication Resource Allocation and Call Set Up Control of Higher Quality of Service," both of which are incorporated herein by reference.

In this section, the call admission control method with priority control is described. This call admission control method takes into account the statistical multiplexing effect between priority and non-priority calls.

As with METHOD2, $T_1(=1/V_{p1})$ is defined as the inverse of peak bit rate for the call whose peak bit rate is the maximum value among the low speed calls. $M_{T_1}$ is the maximum number of cells which can be transferred to the multiplexer line during time $T_1$. Then, through eq. (16) which is similar to e.g., (10), we can obtain $\{G_p(n)\}$ and $\{G_{np}(n)\}$ which are the probability density functions for the number of transferred cells during $T_1$ for priority and non-priority calls, respectively.

$$G_i(n) = \sum_{k=0}^{n} F_i(k)P_i(n-k) \quad \begin{array}{l}(i = p, np) \\ (0 \leq n \leq M_{T_1})\end{array} \tag{16}$$

The following bufferless model is assumed. Assume that $n_p$ cells are transferred from priority calls and $n_{np}$ cells are transferred from non-priority calls during $M_{T_1}$. The multiplexer or multiplexed line tries to deal with the cells from priority calls first. Therefore, when $n_p$ is larger than $M_{T_1}$, $(n_p - M_{T_1})$ cells of priority calls are discarded during $T_1$. The cells from non-priority calls are dealt with after the priority cells are transferred. So, when $n_p(n_p < M_{T_1})$ are transferred from priority calls, the multiplexer or multiplexed line can transfer $(M_{T_1} - n_p)$ non-priority call cells during $T_1$. When the number of cells from non-priority calls is larger than $(M_{T_1} - n_p)$, the cells beyond $(M_{T_1} - n_p)$ are discarded. When $n_p$ is larger than $M_{T_1}$, all non-priority call cells are discarded.

Assuming this bufferless model, we can obtain the expected cell loss rate for non-priority calls through METHOD2, when $n_p$ cells of priority calls are transferred during $T_1$. As a result, the cell loss rate for priority and non-priority calls can be obtained as follows.

The cell loss rate for priority calls, $CLR_p$ is given by eq. (17) which is similar to e.g. (12). Here, $N_j$ is the number of calls of type j.

$$CLR_p = \frac{1}{\rho_p M_{T_1}} \sum_{n=0}^{M_{T_1}} (M_{T_1} - n)G_p(n) - \frac{1-\rho_p}{\rho_p} \tag{17}$$

Cell loss rate for non-priority calls, $CLR_{np}$, is given by eq. (18). Here, CLR(n) is the expected cell loss rate for non-priority calls when n cells are transferred from priority calls during $T_1$.

$$\begin{aligned} CLR_{np} &= \sum_{n=0}^{M_{T_1}} G_p(n)CLR(n) + \sum_{n=M_{T_1}+1}^{\infty} G_p(n) \\ &= \sum_{n=0}^{M_{T_1}} G_p(n)CLR(n) + \left(1 - \sum_{n=0}^{M_{T_1}} G_p(n)\right) \end{aligned} \tag{18}$$

$$\begin{aligned} CLR(n) &= \frac{1}{\rho_{np}M_{T_1}} \sum_{k=M_{T_1}-n+1}^{\infty} [k - (M_{T_1} - n)]G_{np}(k) \\ &= \frac{1}{\rho_{np}M_{T_1}} \sum_{k=0}^{M_{T_1}-n} [(M_{T_1} - n) - k]G_{np}(k) + \\ &\quad \frac{\rho_{np}M_{T_1} - (M_{T_1} - n)}{\rho_{np}M_{T_1}} \end{aligned} \tag{19}$$

where, $$\rho_p = \sum_{\text{Priority call}} N_i V_{ai}/V$$

$$\rho_{np} = \sum_{\text{Non-priority call}} N_i V_{ai}/V$$

The calculation for obtaining $\{G_i(n)\}$ is of the order of $T_1^2$ and the summations of eq. (17)–(19) are of order of $T_1$. Therefore, the amount of calculation for this call admission control method in accordance with the invention is of order $T_1^2$. Moreover, the amount of calculation for this proposed method is independent of the number of kinds of calls.

Here, when high speed calls and low speed calls are multiplexed together, fulfilling priority control for high speed calls so as to reduce the successive cell loss for high speed calls is effective. Of course, METHOD 3 can estimate the cell loss rate when priority control for high speed calls is performed. In this case, $\{G_p(n)\}$ corresponds to the probability density function of high speed calls, $\{F(n)\}$; and $\{G_{np}(n)\}$ corresponds to the probability density function of low speed calls, $\{P(n)\}$—see eq. (16).

7. Performance Evaluation

7.1 Performance Evaluation without Priority Control

In this section, the performance of METHOD1 and METHOD2 is evaluated. The performance is evaluated when two types of calls are multiplexed. In order to evaluate how these methods take into account the effect of statistical multiplexing, the performance of these methods is compared with the performance when all of the calls are assigned their peak bit rate (peak assign strategy).

FIG. 16 shows the load for high speed calls vs. the maximum load for low speed calls when the cell loss rate for each call is smaller than or equal to $10^{-5}$. The high speed call is $V_{p1}=V/10$ and $V_{a1}=V_{p1}/2$. For the low speed call, $V_{p2}=V/100$ and $V_{a2}=V_{p2}/2$. In METHOD1, the period T for sub-bandwidth of high speed calls is equal to $1/V_{p1}$, and the period T for the sub-bandwidth of low speed calls is equal to $1/V_{p2}$. In METHOD2, $T_1$ is equal to $1/V_{p2}$.

Figure 17:
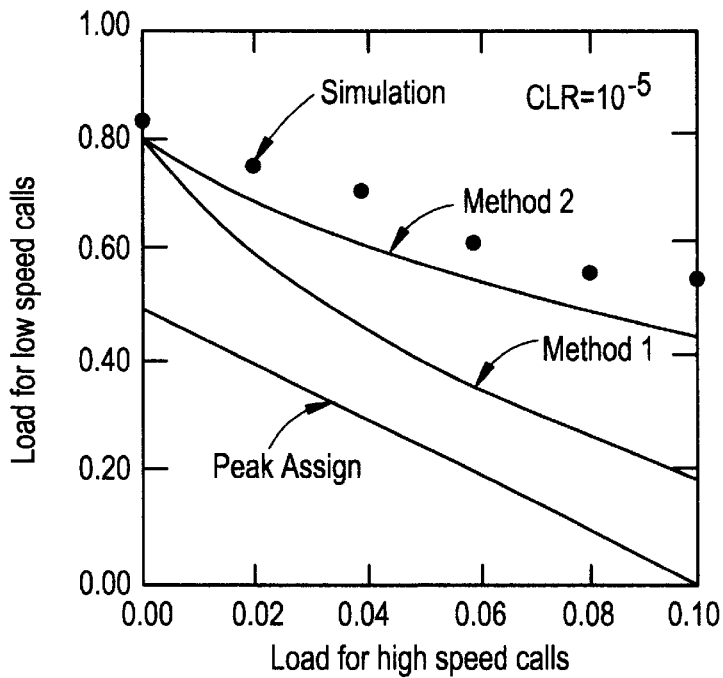
FIG. 17 shows the performance evaluation without priority control and is similar to FIG. 16 but uses Vp1=V/10 and Va1=Vp1/100 for high speed calls and Vp2V/100 and Va2=Vp2/2 for low speed calls in accordance with the present invention.

FIG. 17 is similar to FIG. 16 but uses $V_{p1}=V/10$ and $V_{a1}=V_{p1}/100$ for high speed calls and $V_{p2}V/100$ and $V_{a2}=V_{p2}/2$ for low speed calls.

Compared to the simulation results, METHODS1–2 can operate with a safety margin, which means that the maximum allowable load evaluated by METHODS1–2 is always lower than the load measured by simulation. METHODS1–2 take into account the effect of statistical multiplexing. METHOD1 does not take into account the statistical multiplexing effect between high speed calls and low speed calls, but METHOD2 does. Therefore, especially for the case shown in FIG. 17, METHOD2 is more accurate than METHOD1.

7.2 Performance Evaluation with Priority Control

In this section, the performance of METHOD3 is evaluated. In this method, the bandwidth resources are shared among priority calls and non-priority calls: the effect of statistical multiplexing among these calls is taken into account.

When high speed calls and low speed calls are multiplexed, it is better to fulfill the priority control on high speed calls in order to reduce the successive cell loss for high speed calls. (Ref. 8). Therefore, the performance of METHOD3 is evaluated for the case when priority control for high speed calls are fulfilled.

In order to evaluate how the proposed method takes into account the effect of statistical multiplexing between priority and non-priority calls, the performance of METHOD3 is compared with the performance of METHOD4 which is defined below, and also compared with that of the peak assign strategy. METHOD4:

The bandwidth of the multiplexed line is separated logically into two exclusive sub-bandwidths. One is BW1 for high speed calls which are priority calls. The other is BW2 for low speed calls which are non-priority calls. Here, when the bandwidth of the multiplexed line is BW, BW1+BW2 is equal to BW. METHOD4 involves:

(1) allocating BW1 to the summation of the peak bit rate for high speed calls; and (2) applying METHOD1 or METHOD2 to BW2.

Because the bandwidth of the multiplexed line is separated into exclusive sub-bandwidths, the effect of statistical multiplexing among high speed and low speed calls is not taken into account.

Figure 18:
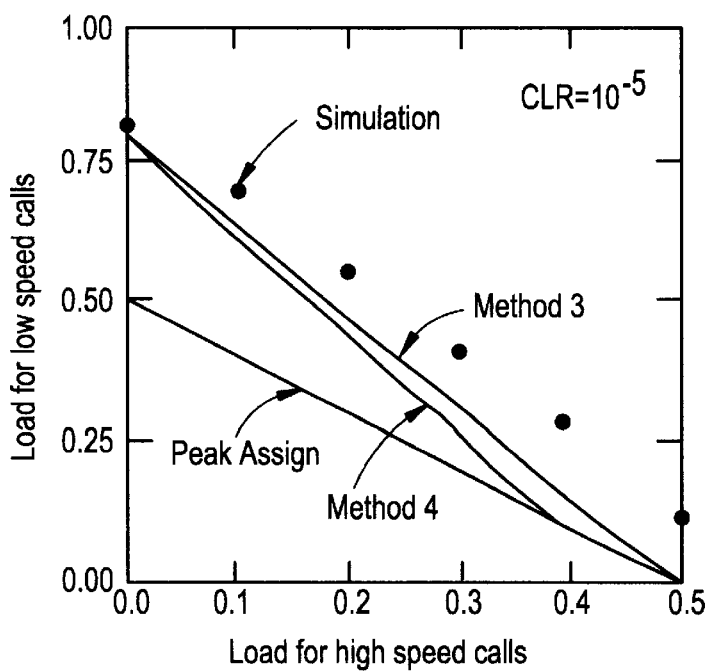
FIG. 18 shows the performance evaluation with priority control and load for high speed calls vs. the maximum load for low speed calls when the CLR for low speed calls is smaller than or equal to $10^{-5}$ in accordance with the present invention.

FIG. 18 shows the load for high speed calls vs. the maximum load for low speed calls when the CLR for low speed calls is smaller than or equal to $10^{-5}$. The high speed calls have $V_{p1}=V/100$ and $V_{a1}=V_{p1}/2$. The low speed calls have $V_{p2}=V/100$ and $V_{a2}=V_{p2}/2$. In METHOD3, the period $T_1$ is equal to $1/V_{p2}$.

Figure 19:
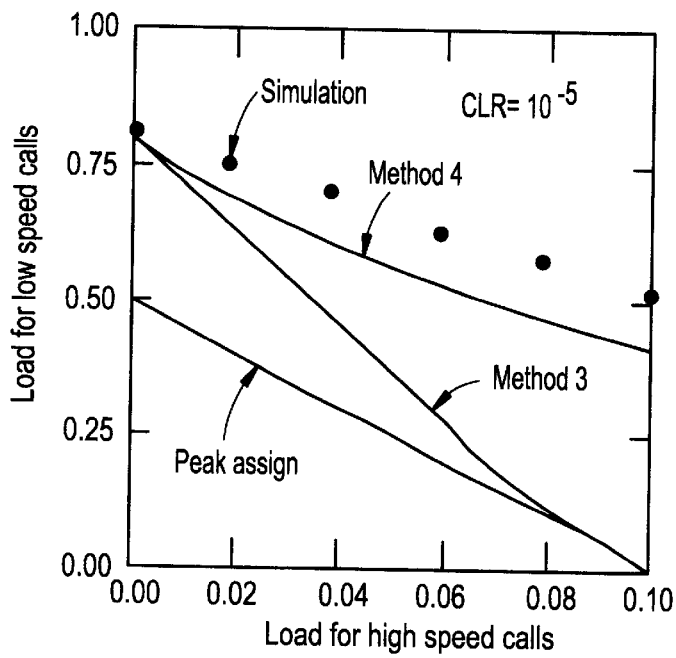
FIG. 19 shows the performance evaluation with priority control where $V_{p1}$=V/10 and $V_{a1}$=$V_{p1}$/100 for high speed calls, and $V_{p2}$=V/100 and $V_{a2}$=$V_{p2}$/2 for low speed calls in accordance with the present invention.

In FIG. 19, $V_{p1}=V/10$ and $V_{a1}=V_{p1}/100$ for high speed calls, and $V_{p2}=V/100$ and $V_{a2}=V_{p2}/2$ for low speed calls.

Compared to the simulation results, METHOD3 operates with a safety margin, which means that the maximum allowable load evaluated by METHOD3 is always smaller than the load measured by simulation.

8. Application to Switching Network 8.1 CLR Sensitive Method

The CLR sensitive call admission control method discussed in Section 6 above is for an output type multiplexer.

Figure 20:
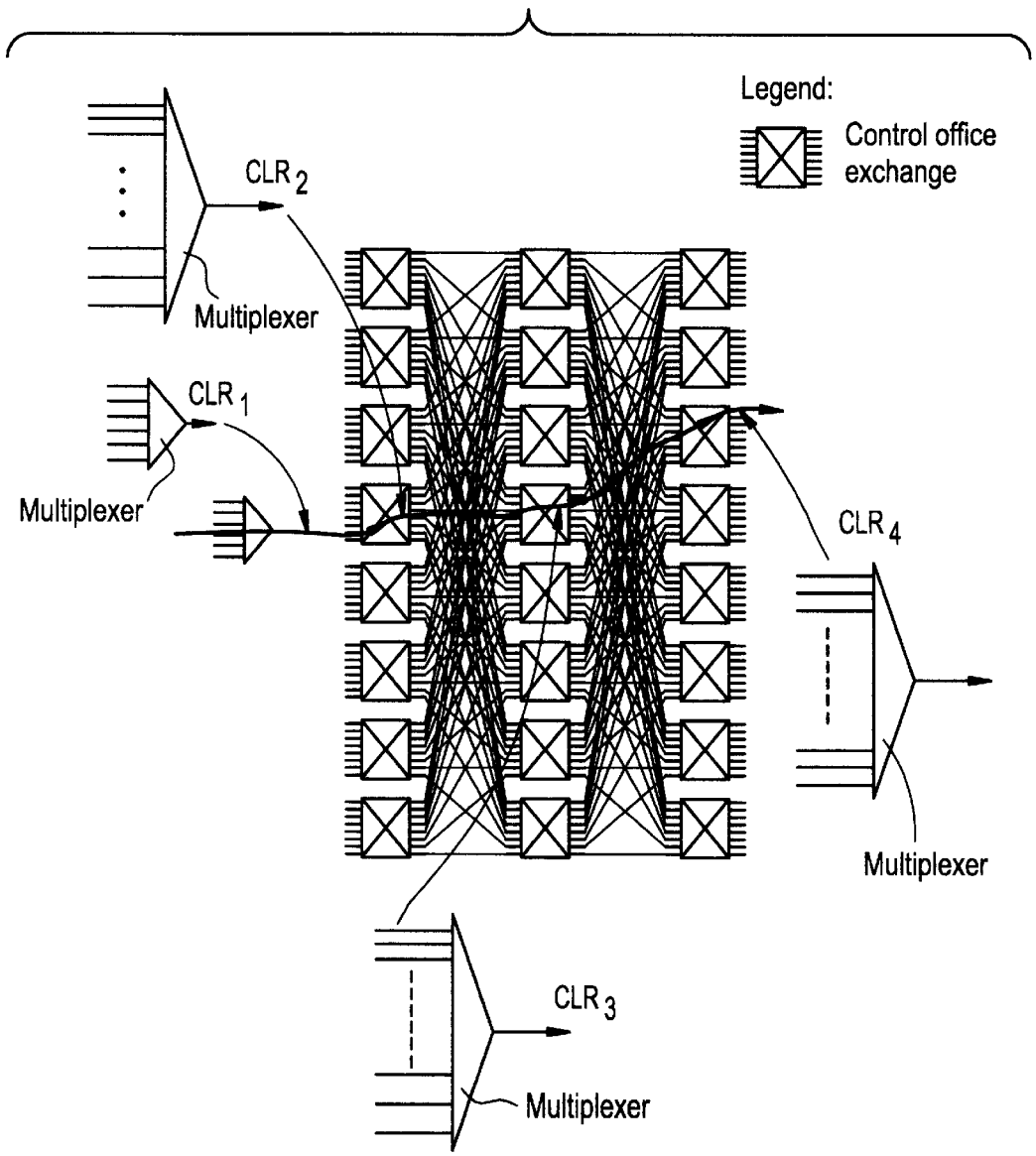
FIG. 20 shows a multi-stage switching network, each point at which cell loss rate occurs is evaluated by assuming a large multiplexer positioned as shown in the figure in accordance with the present invention.

As shown below, the CLR sensitive method can apply not only to a multiplexer but also to a switch (N×N unit switch). Therefore, with a multi-stage switching network such as shown in FIG. 20 each point at which cell loss rate occurs is evaluated by assuming a large multiplexer positioned as shown in the figure. The cell loss rate CLR(s,m,p) at a certain link $1_{s,m,p}$ is evaluated by assuming there exist a multiplexer whose input lines are the input cell flows which transfer the cells toward the corresponding link $1_{s,m,p}$. For example, for the bold line path shown in the FIG. 20, the cell loss rate is given by the summation of four values—$CLR_1$, $CLR_2$, $CLR_3$, and $CLR_4$.

In the following sections, the CLR sensitive call admission control method and the CLR sensitive routing control method for a multi-stage switching network are evaluated.

8.2 Performance Evaluation of Call Admission Control Method

In this subsection, the performance of the CLR sensitive call admission control method for a single-stage switch is discussed.

8.3.1 Evaluation Model

Figure 21A:
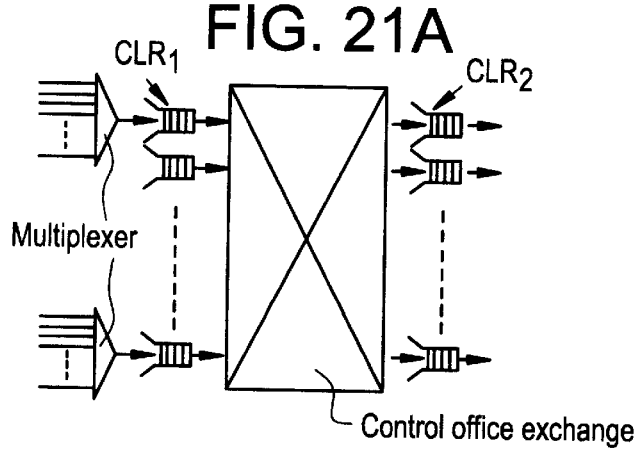
FIG. 21(a) shows a simulation model for the performance evaluation of call admission methods in the output buffered type switch, in accordance with the present invention.

The simulation model is as shown in FIG. 21(a). The switch is an 8×8 output buffered type whose buffer size is 100 cells. The number of both input and output ports are eight. Before cells enter the switch, the cells are first multiplexed. Cell loss rates at these multiplexers are $CLR_1$. After going through the output buffers in the multiplexer, cells are switched. Cell loss rates at the switch output buffer are $CLR_2$—assuming a perfect switch fabric. Each multiplexer has 100 cells of output buffer. Bursty calls generate cells with a 2-state Markov Chain model. Each call has an active state and an idle state. During an active state, the cells are generated periodically at the call's peak bit rate. During an idle state, no cells are generated. Both the distributions of active and idle stats are geometrical. The average period of the active states is $M_a$, and the average of the idle periods is $M_i$.

V is defined as the bit rate of the multiplexed line; $V_p$ is the peak bit rate of the multiplexed call; and $V_a$ is the average bit rate of the multiplexed call. Two kinds of calls, high speed and low speed, are multiplexed. High speed calls have the peak bit rate that are large compared to V. High speed calls have $V_p=V/10$, $V_a=V_p/10$, $M_a=100$ cells, and $M_i=900$ cells. Low speed calls have $V_p=V/100$, $V_a=V_p/2$, $M_a=100$ cells, and $M_i=100$ cells.

Figure 21B:
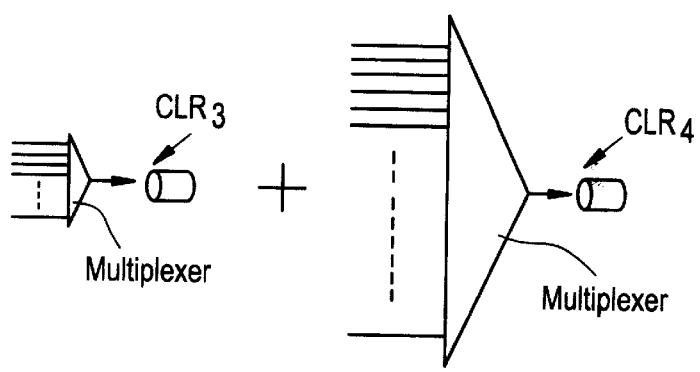
FIG. 21(b) shows the performance evaluation of call admission control method, the cell loss rate of each call is evaluated assuming the multiplexer model in accordance with the present invention.

In the CLR sensitive call admission control method, the cell loss rate of each call is evaluated assuming the multiplexer model shown in FIG. 21(b). As shown in the following subsection, $CLR_3$ and $CLR_4$, which are estimated by assuming the model shown in FIG. 21(b), accurately reflect $CLR_1$ and $CLR_2$.

In the performance evaluation, the input and output ports of each call are chosen at random.

8.3.2 Without Priority Control

In this subsection, the performance when priority control is not performed is evaluated through computer simulation.

Figure 22:
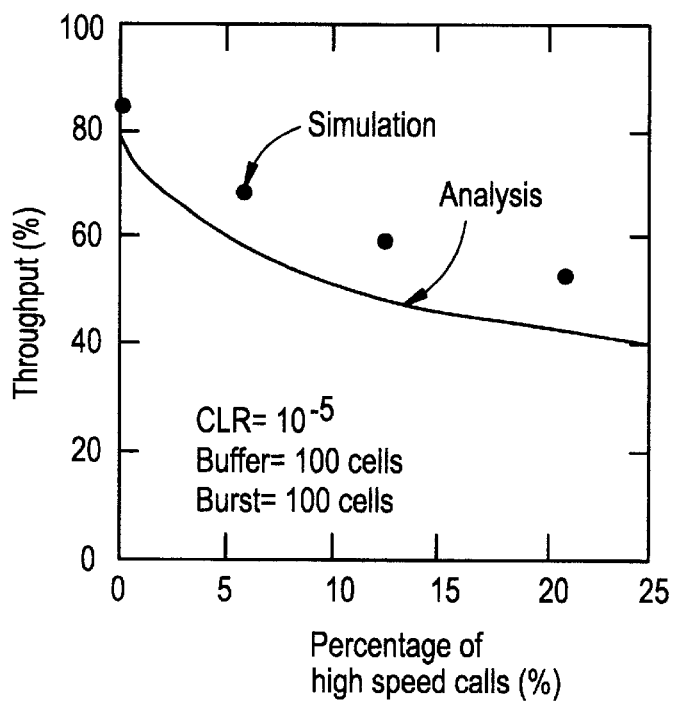
FIG. 22 shows the performance when the priority control is not performed and the throughput of the system, when the cell loss rate is $10^{-5}$, by plotting percentage of high speed calls vs. the system throughput in accordance with the present invention.

FIG. 22 shows the throughput of the system, when the cell loss rate is $10^{-5}$. The horizontal axis is the percentage of high speed calls. The vertical axis is the system throughput. The solid line is obtained using the CLR sensitive call admission control method. The dots are estimated by computer simulation for the model shown in FIG. 21(a).

Compared to the simulation results, the CLR sensitive method can operate with a safety margin, which means that the throughput evaluated by the CLR sensitive method is always lower than the throughput measured by simulation. Moreover, the CLR sensitive method is fairly accurate compared to the simulation results.

8.3.3 With Priority Control

In this subsection, the performance when priority control is performed is evaluated. Priority control means that the cells for priority calls are dealt with first before the cells for non-priority calls. Therefore, from the view point of discarding cells, when there is no buffer space for the arrived priority cell, the non-priority cells are discarded in order to buffer the priority cells, if there are non-priority cells in the buffer. The priority cells are discarded only when there is no non-priority cells in the buffer.

The simulation model is the same as in the previous subsection. Both priority calls and non-priority calls have high speed calls and low speed calls. In terms of the number of calls, 50% of the calls are high speed.

Figure 23:
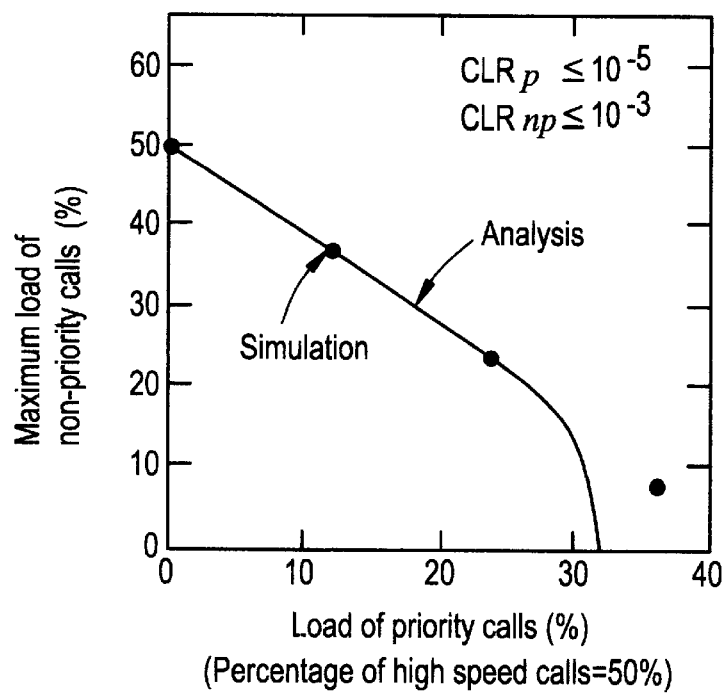
FIG. 23 shows the performance when the priority control is not performed and the throughput of the system, when the cell loss rate of priority calls is no more than $10^{-5}$ and the cell loss rate of non-priority calls is no more than $10^{-3}$, by plotting the offered load of priority calls vs. the offered load of non-priority calls in accordance with the present invention.

FIG. 23 shows the throughput of the system, when the cell loss rate of priority calls is no more than $10^{-5}$ and the cell loss rate of non-priority calls is no more than $10^{-3}$. The horizontal axis is the offered load of priority calls. The vertical axis is the offered load of non-priority calls. The solid line is obtained using the CLR sensitive call admission control method. The dots are estimated by simulation for the model shown in FIG. 21($a$).

Again, the throughput evaluated by the CLR sensitive method is never larger than the throughput measured by simulation.

8.4 Evaluation of Routing Control

The performance of the CLR sensitive routing control method may now be evaluated. Heterogeneous traffic is offered to the 3-stage self-routing networks shown in FIG. 24. The performance is compared with the case of a 2-stage self-routing network shown in FIG. 25 which does not require the use of the routing control method since there is only one routing path between the designated source and destination.

8.4.1 Evaluation Model

Figure 24:
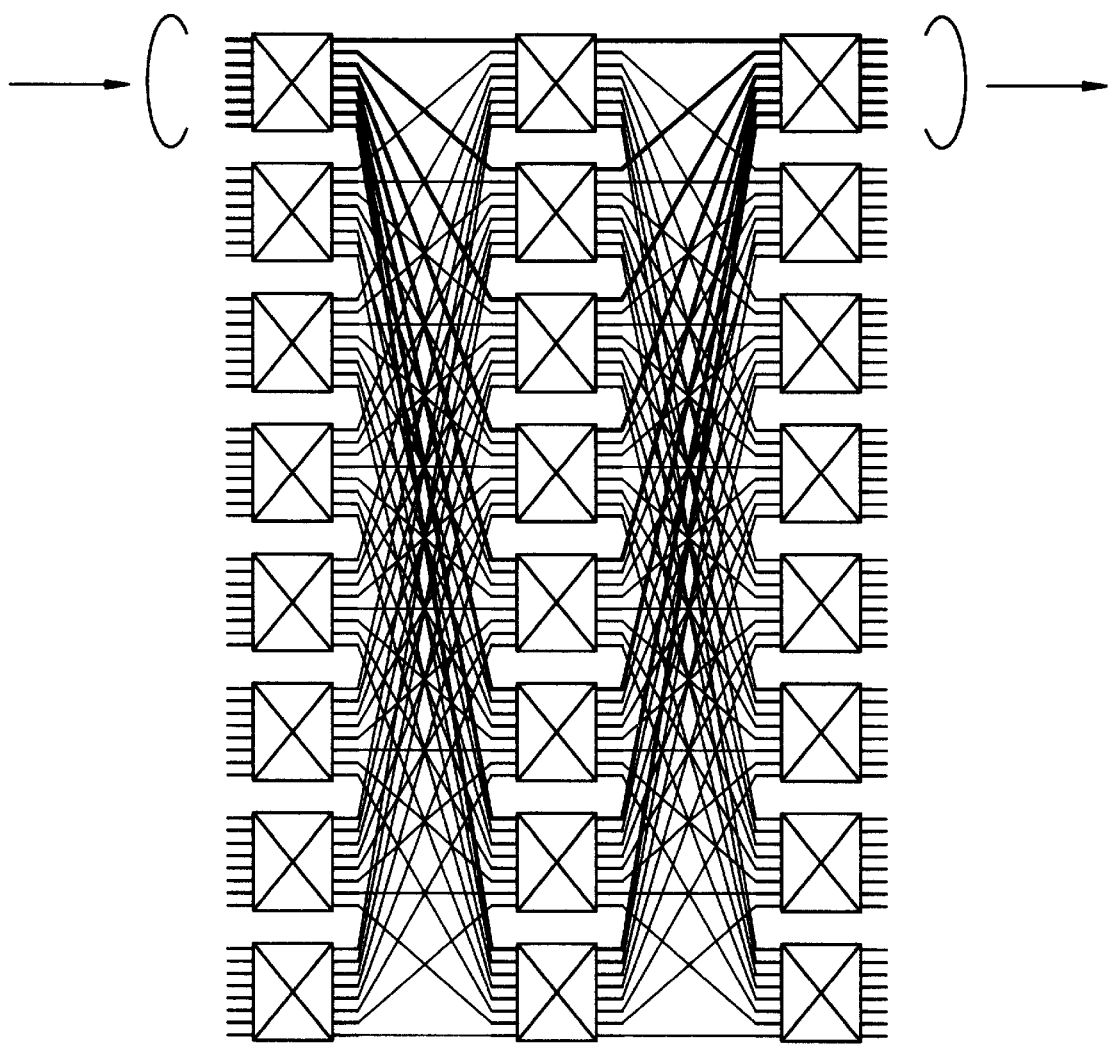
FIG. 24 shows the performance when the priority control is not performed and the performance of the CLR sensitive routing control method may be evaluated, heterogeneous traffic is offered to the 3-stage self-routing networks in accordance with the present invention.
Figure 24:
Figure 25:
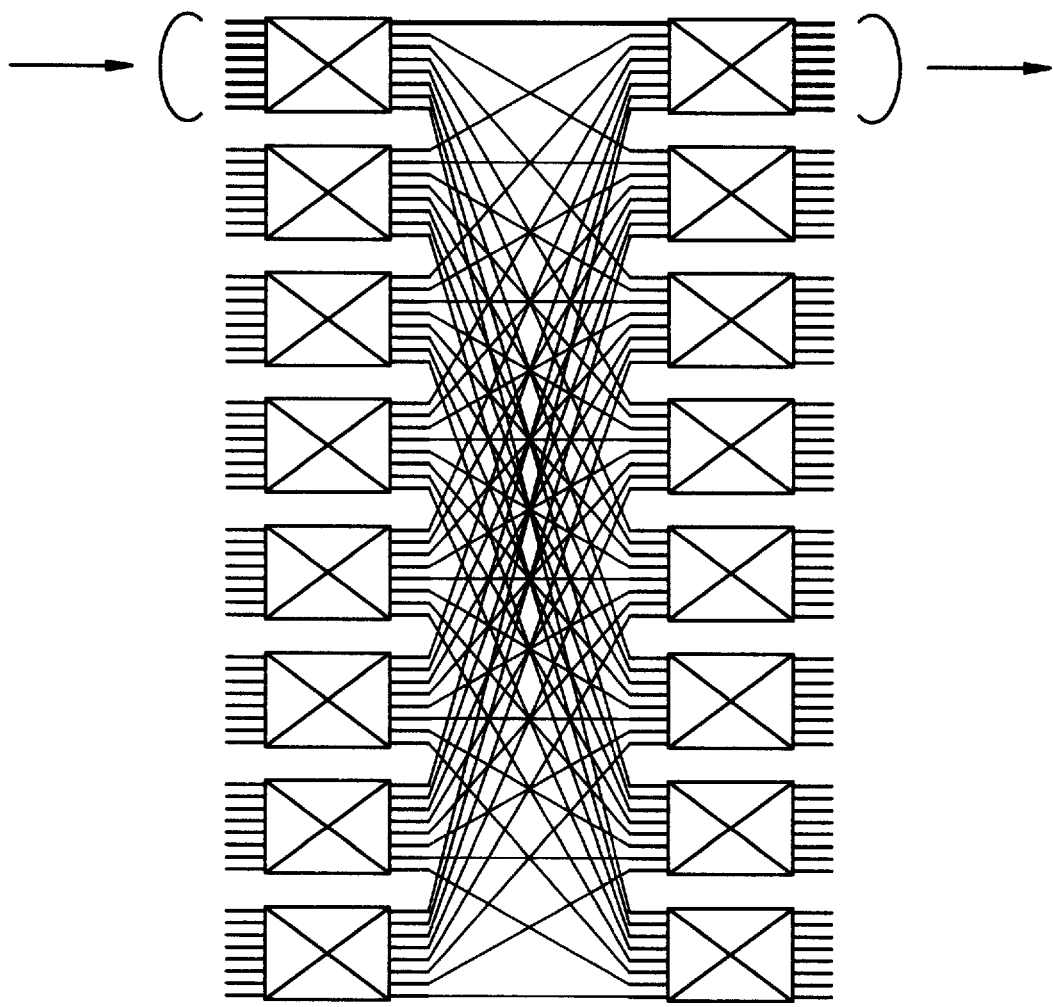
FIG. 25 shows the performance when the priority control is not performed and is compared with the case of a 2-stage self-routing network which does not require the use of the routing control method since there is only one routing path between the designated source and destination in accordance with the present invention.
Figure 25:

The evaluation switch model is shown in FIGS. 24 and 25. The switches are 64×64 multi-stage switches which are composed of 8×8 switch modules. The 3-stage switch shown in FIG. 24 is called a re-arrangable switching network. The 3-stage switch shown in this figure has eight paths for any given input/output port pair. Therefore, when a given path corresponding to a given input/output port pair is congested, another path may be switched in for use between the given input/output port pair.

The 2-stage switch does not require routing control at call set-up, but the 3-stage switch does require routing control. Again, the routing path is selected call by call, not cell by cell. Routing control is performed based on the cell loss rates which are estimated by call admission control as explained above. Because the 3-stage switch does require routing control and the 2-stage switch does not, the comparison of the throughput of the two switches provides an indication of the performance of the routing control method. The CLR sensitive routing control method may be said to work well if the use of the CLR sensitive routing control method for the 3-stage switch yields a higher throughput as compare with the 2-stage switch.

8.4.2 Performance Evaluation

In this section the performance of the CLR sensitive routing control method is evaluated for a 64×64 multi-stage switch.

Heterogeneous traffic is loaded to the switches composed of biased and background traffic. The background traffic is homogeneous, and the input and output ports of each call are selected randomly.

The biased traffic used in the evaluation is from module 1 at the first stage to module 1 at the final stage, where the modules of each stage are numbered from 1 to 8 starting at the top module. The biased traffic is distributed randomly among the eight input and output ports.

FIG. 25 shows the case of the 2-stage switch. There is only one link for the biased traffic between the first stage module and the second (final) stage module. Thus, this link will be the bottleneck for this switch since the maximum throughput for the input and output ports are eight times the throughput of the bottleneck link.

FIG. 24 shows the case of the 3-stage switch. There are eight paths for the biased traffic between the first and final stage modules. Thus the maximum throughput of the input ports, the output ports, the links between the first and second stage modules, and the links between the second and final stage modules are the same. Thus, there in no bottleneck. Thus, when biased traffic is offered with the CLR sensitive routing control method, the 3-stage switch should yield higher throughput than the 2-stage switch.

In the evaluations, high speed calls and low speed calls are multiplexed. High speed calls have $V_p$=V/10, $V_a$=$V_p$/100. Low speed calls have $V_p$=V/100, $V_a$=$V_p$/10.

Figure 26:
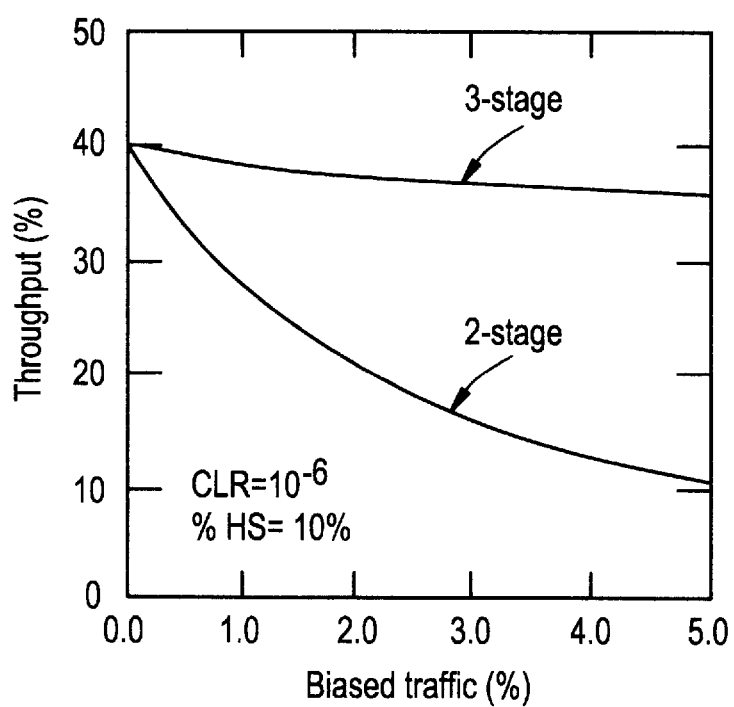
FIG. 26 shows the performance when the priority control is not performed and the throughput of the switch vs. the load of the biased traffic when the required cell loss rate is $10^{-6}$ in accordance with the present invention.

FIG. 26 shows the throughput of the switch vs. the load of the biased traffic when the required cell loss rate is $10^{-6}$. For example, when the load of the biased traffic is 5%, 95% of the traffic is background traffic. Here, the percentage of high speed calls in terms of the number of calls is 10%. As shown, the throughput of the 2-stage switch drops suddenly with the increase of the biased traffic load. However, due to the use of the routing control method on the 3-stage switch, the throughput of the 3-stage switch decreases only slightly.

9. Summary

The invention evaluates the characteristics of ATM traffic and sets forth a CLR sensitive routing control method.

(1) Characteristics of ATM traffic

In an ATM network, the cell loss rate is more sensitive to offered load than the queuing delay, when the buffer size is small, e.g., a few hundred cells. Usually, even when the queuing delay is fairly small, the cell loss rate is large. This means that the quality of service (QOS) requirement that determines the utilization efficiency of the multiplexed line is not the queuing delay but the cell loss rate. Therefore, both call admission control and routing control should use a cell loss rate sensitive method.

(2) Routing and Call Admission Control Method

The CLR sensitive routing control method uses the cell loss rate as the cost function in order to select the best path for the certain source and destination pair. Because the ATM traffic is sensitive to cell loss rate, the CLR sensitive routing method can achieve higher network throughput than the throughput of the conventional routing methods which are delay sensitive or queuing sensitive.

The procedure for determining routing and call admission in accordance with the invention may be summarized as follows.

1. Update Routing Table—The cost factors for the paths between all source/destination pairs are determined according to the methods described above, e.g., METHODS1–4 and equations (1)–(19). The cost factor is equal to or a function of the CLR. In this evaluation, the cost factor for each link is evaluated, and the sum of the link cost factors is used as per equation (3) to obtain the cost factor for a given path. Using the calculated cost factors, the shortest path is obtained using known shortest path routing techniques such as Bellman-Ford, Dijkstra, Floyd-Warshall, ARPANET, TYMNET. (See, for example, Ref. 9, Chapter 5). The routing table may be updated periodically or on demand with every call set-up.

2. Receipt of Call Set-Up—A call set-up request is received from time to time. Each call set-up request conveys relevant information such as:

a) the required CLR (depending on the QOS desired);
b) the source and destination; and
c) traffic descriptors such as peak bit rate, average bit rate, etc.

3. Execute Call Admission—The cost factor (CLR) is calculated using the traffic parameters of the requesting call for all paths connecting the source/destination pair specified by the requesting call. The shortest path cost factor (CLR) is selected and compared with the required CLR (or a required cost factor calculated from the required CLR) specified in the call set-up request. If the calculated cost factor (CLR) is lower than the required cost factor (CLR), the call is accepted and the routing tables are updated reflecting the new accepted call.

The CLR sensitive call admission control method has the following features. First, the amount of calculation for evaluating the cell loss rate is reduced dramatically. The amount of calculation does not increase even in the multimedia case, using recursive equations and probability functions in calculating cell loss rate. Second, evaluated cell loss rate is always within a safety margin due to the bufferless model. Third, policing control can be performed easily, because the traffic parameters used in these methods are only the peak bit rate and the average bit rate for each call. Fourth, the method can be applied to the case when priority control is fulfilled. Finally, the method can be applied to a switching network.

Appendix

Define $R_k(n_1, n_2, \ldots, n_j, \ldots, n_L)$ as the probability that k cells are transferred from all multiplexed calls, when the number of calls of type j is $n_j$. Here, $n_j$ corresponds to $[N_j V_{pj}/V_{p0}]$. Then P(k) and $R_k(n_1, n_2, \ldots, n_j, \ldots, n_L)$ are given by eq. (A-1) and eq. (B-2).

$$P(k) = a_{j0} R_k(n_1, n_2, \ldots, n_j, \ldots n_L) + a_{j1} R_k(n_1, n_2, \ldots, n_j+1, \ldots, n_L) \quad (A\text{-}1)$$

$$R_k(n_1, \ldots, n_j+1, \ldots, n_L) = \quad (A\text{-}2)$$

$$\begin{cases} (1-\alpha_j) R_0(n_1, \ldots, n_j, \ldots n_L) \\ a_j R_{k-1}(n_1, \ldots, n_j, \ldots, n_L) + (1-\alpha_j) R_k(n_1, \ldots, n_j, \ldots, n_L) \end{cases}$$

When $a_{j0}$, $a_{j1}$ and $P_k$ are known, we can calculate $\{R_k(n_1, n_2, \ldots, n_j, \ldots, n_L)\}$ using eq. (B-1) and eq. (B-2).

When one call of type j is newly established, {P'(k)} can be obtained by eq. (B-3). Here, $a'_{j0}$ and $a'_{j1}$ are the updated values.

$$P'(k) = a'_{j0} R_k(n_1, n_3, \ldots, n_j, \ldots, n_L) + a'_{j1} R_k(n_1, n_2, \ldots, n_j+1, \ldots n_L) (0 \leq K, \quad (A\text{-}3)$$

When one call of type j is newly established, (1) obtain $\{R_k(n_1, n_2, \ldots, n_j, \ldots n_L)\}$ from eq. (B-1) and eq. (B-2), (2) update $a_{j0}$, $a_{j1}$ and {P(k)}. As a results, the amount calculation for $\{P_k\}$ is order T.

Incidentally, when $[(N_1+1)V_{pj}/V_{p0}]$ becomes $n_j+1$, we must obtain $\{R_k(n_1, n_2, \ldots, +2, \ldots n_L)\}$. We can obtain $\{R_k(n, n_2, \ldots, n_j+2, \ldots, n_L)\}$ using eq. (A-4) which is a modification of eq. (B-2). In this case, the amount of calculation for {P'(k)} is also order T.

$$R_k(n_1, \ldots, n_j+2, \ldots, n_L) = \quad (A\text{-}4)$$

-continued $$\begin{cases} a_j R_{k-1}(n_1, \ldots, n_j+1, \ldots, n_L) + (1-\alpha_j) R_k(n_1, \ldots, n_j+1 \\ (1-\alpha_j) R_k(n_1, \ldots, n_j+1, \ldots n_L) \end{cases}$$

What is claimed is:

1. A method for routing offered traffic through an Asynchronous Transfer Mode (ATM) network comprising nodes wherein each node is adapted to communicate with each of the other nodes, said method comprising the step of generating sets of routes between source and destination node pairs wherein each route comprises at least one link interconnecting specific nodes, wherein each node comprises a multiplexer connecting each link incoming into a node to a multiplexed line which forms a link to another node, said method further comprising the steps of:

controlling the selection of traffic routes between said source and destination node pairs from the corresponding sets of routes by evaluating each of the routes in the corresponding sets of routes using a routing protocol in which cell loss rates of the sets of routes are used as matrix elements of a routing matrix in a routing protocol calculation;

dividing calls into priority calls and non-priority calls according to a preset criteria; and performing a priority control to favor said priority calls over said non-priority calls such that priority calls are transferred before said non-priority calls, wherein evaluating said cell loss rate comprises the steps of:

(a) determining a probability distribution function (G) for priority calls (p) and for non-priority (np) calls from $$G_i(n) = \sum_{k=0}^{n} F_i(k) P_i(n-k) \quad \begin{matrix} (i = p, np) \\ (0 \leq n \leq M_{T_1}) \end{matrix}$$

where $$P(k) = \sum_{k=n_1+n_2+\ldots n_L} \prod_{j=0}^{L} \binom{N_j}{n_j} \alpha_j^{n_j} (1-\alpha_j)^{N_j-n_j}$$

$$\alpha_j = V_{aj}/V_{pj}, \qquad \rho = \sum_{j=1}^{L} N_j V_{aj}/V$$

$$F(n) = \sum_{n=n_1+n_2+\ldots+n_L} \prod_{k=1}^{L} Q_k(n_k)$$

$$Q_k(n_k) = \begin{cases} \binom{N_k}{l} \alpha_k^l (1-\alpha_k)^{N_k-1} & (n_k = 1 \lfloor V_{pk} T_1 \rfloor) \\ 0 & \text{(otherwise)} \end{cases}$$

where $\lfloor \; \rfloor$ is defined as an integer which is a smallest integer closest to the number within $\lfloor \; \rfloor$ and is greater than the number within $\lfloor \; \rfloor$ if the number within $\lfloor \; \rfloor$ is not an integer, or, if the number within $\lfloor \; \rfloor$ is an integer, then $\lfloor \; \rfloor$ is defined as the number within $\lfloor \; \rfloor$, $M_{T1}$ is the maximum number of cells that can be transferred to a multiplexed line during the time $T_1$, $T_1$ is the inverse of the peak bit rate for the call whose peak bit rate is the maximum value among the non-priority calls, V is the bit rate of the multiplexed line, $N_j$ is the number of calls of type j, $n_j$ is the number of activated calls of type j, Vpj is the peak bit rate of the activated call j, $V_{aj}$ is the average bit rate of the activated call j, P(k) is a probability density function for a packet arriving in a number k and where the peak bit rate for the calls is smaller than a predetermined value driven from a system parameter such as a speed of the multiplexed line, $Q_k$ is a probability density function for a packet arriving in the number of k from a certain type of call, and where the peak rate for the calls is greater than a predetermined value driven from the system parameter, L is an integer equal to the number of types of calls that are multiplexed, and where F(n) is evaluated when a new call is established through the recursive equation, $$F'(n) = \begin{cases} \frac{1}{1-\alpha_j} [F(n) - \alpha_j F(n-m_j)] & (1 \leq n \leq M_{T_1}) \\ \frac{1}{1-\alpha_j} F(0) & (n=0) \end{cases}$$

(b) evaluating the cell loss rate for priority calls from $$CLR_p = \frac{1}{\rho_p M_{T_1}} \sum_{n=0}^{M_{T_1}} (M_{T_1} - n) G_p(n) - \frac{1-\rho_p}{\rho_p}$$

and for non-priority calls from $$CLR_{np} = \sum_{n=0}^{M_{T_1}} G_p(n) CLR(n) + \sum_{n=M_{T_1}+1}^{\infty} G_p(n)$$

$$= \sum_{n=0}^{M_{T_1}} G_p(n) CLR(n) + \left(1 - \sum_{n=0}^{M_{T_1}} G_p(n)\right)$$

$$CLR(n) = \frac{1}{\rho_{np} M_{T_1}} \sum_{k=M_{T_1}-n+1}^{\infty} [k - (M_{T_1} - n)] G_{np}(k)$$

$$= \frac{1}{\rho_{np} M_{T_1}} \sum_{k=0}^{M_{T_1}-n} [(M_{T_1} - n) - k] G_{np}(k) + \frac{\rho_{np} M_{T_1} - (M_{T_1} - n)}{\rho_{np} M_{T_1}}$$

where, $$\rho_p = \sum_{\text{Priority call}} N_j V_{aj}/V$$

$$\rho_{np} = \sum_{\text{Non-priority call}} N_j V_{aj}/V$$

2. In an ATM network wherein calls comprising a plurality of cells are transferred along said network which includes a plurality of nodes interconnected by communication links, each node adapted to communicate with a plurality of other nodes, each node including a multiplexer for coupling incoming links to an outgoing multiplexed line, a method of call admission comprising the steps of:

1) dividing calls into priority calls and non-priority calls according to a preset criteria;

2) performing a call admission analysis to determine whether to accept or reject a call set-up request by evaluating a cell loss rate along candidate routes between a source and destination node so as to favor said priority calls over said non-priority calls such that priority calls are transferred before said non-priority calls;

3) said step of evaluating a cell loss rate for each candidate route comprises the steps of:

(a) determining a probability distribution function (G) for priority calls (p) and for non-priority (np) calls from $$G_i(n) = \sum_{k=0}^{n} F_i(k) P_i(n-k) \quad \begin{array}{l}(i = p, np) \\ (0 \leq n \leq M_{T_1})\end{array}$$

where $$P(k) = \sum_{k=n_1+n_2+\ldots n_L} \prod_{j=0}^{L} \binom{N_j}{n_j} \alpha_j^{n_j}(1-\alpha_j)^{N_j-n_j}$$

$$\alpha_j = V_{aj}/V_{pj}, \rho = \sum_{j=1}^{L} N_j V_{aj}/V$$

$$F(n) = \sum_{n=n_1+n_2+\ldots+n_L} \prod_{k=1}^{L} Q_k(n_k)$$

$$Q_k(n_k) = \begin{cases} \binom{N_k}{l} \alpha_k^l (1-\alpha_k)^{N_k-l} & (n_k = 1\lfloor V_{pk} T_1 \rfloor) \\ 0 & \text{(otherwise)} \end{cases}$$

where $\lfloor \ \rfloor$ is defined as an integer which is a smallest integer closest to the number within $\lfloor \ \rfloor$ and is greater than the number within $\lfloor \ \rfloor$ if the number within $\lfloor \ \rfloor$ is not an integer, or, if the number within $\lfloor \ \rfloor$ is an integer, then $\lfloor \ \rfloor$ is defined as the number within $\lfloor \ \rfloor$, $M_{T1}$ is the maximum number of cells that can be transferred to a multiplexed line during the time $T_1$, $T_1$ is the inverse of the peak bit rate for the call whose peak bit rate is the maximum value among the non-priority calls, V is the bit rate of the multiplexed line, $N_j$ is the number of calls of type j, $n_j$ is the number of activated calls of type j, Vpj is the peak bit rate of the activated call j, $V_{aj}$ is the average bit rate of the activated call j, P(k) is a probability density function for a packet arriving in a number k and where the peak bit rate for the calls is smaller than a predetermined value driven from a system parameter such as a speed of the multiplexed line, $Q_k$ is a probability density function for a packet arriving in the number of k from a certain type of call, and where the peak rate for the calls is greater than a predetermined value driven from the system parameter, L is an integer equal to the number of types of calls that are multiplexed, and where F(n) is evaluated when a new call is established through the recursive equation, $$F'(n) = \begin{cases} \frac{1}{1-\alpha_j} [F(n) - \alpha_j F(n-m_j)] & (1 \leq n \leq M_{T_1}) \\ \frac{1}{1-\alpha_j} F(0) & (n=0) \end{cases}$$

(b) evaluating the cell loss rate for priority calls from $$CLR_p = \frac{1}{\rho_p M_{T_1}} \sum_{n=0}^{M_{T_1}} (M_{T_1} - n) G_p(n) - \frac{1-\rho_p}{\rho_p}$$

and for non-priority calls from $$CLR_{np} = \sum_{n=0}^{M_{T_1}} G_p(n) CLR(n) + \sum_{n=M_{T_1}+1}^{\infty} G_p(n)$$

$$= \sum_{n=0}^{M_{T_1}} G_p(n) CLR(n) + \left(1 - \sum_{n=0}^{M_{T_1}} G_p(n)\right)$$

$$CLR(n) = \frac{1}{\rho_{np} M_{T_1}} \sum_{k=M_{T_1}-n+1}^{\infty} [k - (M_{T_1} - n)] G_{np}(k)$$

$$= \frac{1}{\rho_{np} M_{T_1}} \sum_{k=0}^{M_{T_1}-n} [(M_{T_1} - n) - k] G_{np}(k) + \frac{\rho_{np} M_{T_1} - (M_{T_1} - n)}{\rho_{np} M_{T_1}}$$

where, $$\rho_p = \sum_{\text{Priority call}} N_j V_{aj}/V \quad \rho_{np} = \sum_{\text{Non-priority call}} N_j V_{aj}/V$$

$$\rho_p = \sum_{\text{Priority call}} N_j V_{aj}/V \quad \rho_{np} = \sum_{\text{Non-priority call}} N_j V_{aj}/V$$

3. A method for routing offered traffic through a multi-stage switching Asynchronous Transfer Mode (ATM) network comprising input and output ports and a plurality of at least three switching stages interconnecting the input and output ports, the method including the steps of:

1) generating a set of candidate switching routes between a given input and output port pair;

2) selecting a traffic route between the given input and output port pair from the set of candidate routes by using a routing protocol in which cell loss rates for each candidate switching route are used as matrix elements of a routing matrix in a routing protocol calculation; and 3) routing the offered traffic through said multi-stage switching unit along the selected switching route, wherein the step of evaluating the cell loss rate includes the steps of:

(a) determining a probability distribution function (G) for priority calls (p) and for non-priority (np) calls from $$G_i(n) = \sum_{k=0}^{n} F_i(k) P_i(n-k) \quad \begin{array}{l}(i = p, np)\\(0 \le n \le M_{T_1})\end{array}$$

where $$P(k) = \sum_{k=n_1+n_2+\ldots n_L} \prod_{j=0}^{L} \binom{N_j}{n_j} \alpha_j^{n_j}(1-\alpha_j)^{N_j-n_j}$$

$$\alpha_j = V_{aj}/V_{pj}, \quad \rho = \sum_{j=1}^{L} N_j V_{aj}/V$$

$$F(n) = \sum_{n=n_1+n_2+\ldots+n_L} \prod_{k=1}^{L} Q_k(n_k)$$

-continued $$Q_k(n_k) = \begin{cases} \binom{N_k}{l} \alpha_k^l (1-\alpha_k)^{N_k-l} & (n_k = 1\lfloor V_{pk}T_1 \rfloor) \\ 0 & (\text{otherwise}) \end{cases}$$

where $\lfloor \; \rfloor$ is defined as an integer which is a smallest integer closest to the number within $\lfloor \; \rfloor$ and is greater than the number within $\lfloor \; \rfloor$ if the number within $\lfloor \; \rfloor$ is not an integer, or, if the number within $\lfloor \; \rfloor$ is an integer, then $\lfloor \; \rfloor$ is defined as the number within $\lfloor \; \rfloor$, $M_{T_1}$ is the maximum number of cells that can be transferred to a multiplexed line during the time $T_1$, $T_1$ is the inverse of the peak bit rate for the call whose peak bit rate is the maximum value among the non-priority calls, V is the bit rate of the multiplexed line, $N_j$ is the number of calls of type j, $n_j$ is the number of activated calls of type j, Vpj is the peak bit rate of the activated call j, $V_{aj}$ is the average bit rate of the activated call j, P(k) is a probability density function for a packet arriving in a number k and where the peak bit rate for the calls is smaller than a predetermined value driven from a system parameter such as a speed of the multiplexed line, $Q_k$ is a probability density function for a packet arriving in the number of k from a certain type of call, and where the peak rate for the calls is greater than a predetermined value driven from the system parameter, L is an integer equal to the number of types of calls that are multiplexed, and where F(n) is evaluated when a new call is established through the recursive equation, $$F'(n) = \begin{cases} \frac{1}{1-\alpha_j} [F(n) - \alpha_j F(n-m_j)] & (1 \le n \le M_{T_1}) \\ \frac{1}{1-\alpha_j} F(0) & (n = 0) \end{cases}$$

(b) evaluating the cell loss rate for priority calls from $$CLR_p = \frac{1}{\rho_p M_{T_1}} \sum_{n=0}^{M_{T_1}} (M_{T_1} - n) G_p(n) - \frac{1-\rho_p}{\rho_p}$$

and for non-priority calls from $$CLR_{np} = \sum_{n=0}^{M_{T_1}} G_p(n) CLR(n) + \sum_{n=M_{T_1}}^{\infty} G_p(n)$$

$$= \sum_{n=0}^{M_{T_1}} G_p(n) CLR(n) + \left(1 - \sum_{n=0}^{M_{T_1}} G_p(n)\right)$$

$$CLR(n) = \frac{1}{\rho_{np} M_{T_1}} \sum_{k=M_{T_1}-n+1}^{\infty} [k - (M_{T_1} - n)] G_{np}(k)$$

$$= \frac{1}{\rho_{np} M_{T_1}} \sum_{k=0}^{M_{T_1}} [(M_{T_1} - n) - k] G_{np}(k) + \frac{\rho_{np} M_{T_1} - (M_{T_1} - n)}{\rho_{np} M_{T_1}}$$

where,

-continued
$$\rho_p = \sum_{\text{Priority call}} N_j V_{aj}/V \quad \rho_{np} = \sum_{\text{Non-priority call}} N_j V_{aj}/V$$

4. A method for routing offered traffic through an Asynchronous Transfer Mode (ATM) network comprising nodes wherein each node is adapted to communicate with each of the other nodes and comprises a multiplexer connecting each link incoming into a node to a multiplexed line which forms a link to another node, the method comprising the steps of:

generating sets of routes between source and destination node pairs wherein each route comprises at least one link interconnecting specific nodes;

controlling the selection of traffic routes between said source and destination node pairs from the corresponding sets of routes by evaluating the routes with respect to cell loss rates of the sets;

dividing calls into priority calls and non-priority calls according to a preset criteria; and performing a priority control to favor the priority calls over the non-priority calls such that the priority calls are transferred before the non-priority calls;

wherein the cell loss rates are obtained by:

(a) determining a probability distribution function indicating a probability for a given number of cells to be transferred from multiplexed calls during a prescribed time, for each class of the priority calls and the non-priority calls; and (b) calculating the cell loss rate for each class of the priority calls and the non-priority calls from the probability distribution function for each class of the priority calls and the non-priority calls, and wherein the step (a) determines the probability distribution functions by:

(a1) dividing calls into high speed calls and low speed calls according to peak bit rates of calls;

(a2) calculating a first probability for a given number of cells to be transferred from high speed calls during a prescribed time, and a second probability for a given number of cells to be transferred from low speed calls during a prescribed time, for each class of the priority calls and the non-priority calls; and (a3) calculating a convolution of the first probability and the second probability for each class of the priority calls and the non-priority calls to obtain the probability distribution function for each class of the priority calls and the non-priority calls.

5. A method for routing offered traffic through a multi-stage switching Asynchronous Transfer Mode (ATM) network comprising input and output ports and a plurality of at least three switching stages interconnecting the input and output ports, the method comprising the steps of:

generating a set of candidate switching routes between a given input and output port pair;

evaluating the selection of the traffic route between the given input and output port pair from the set of candidate routes in response to cell loss rates for each candidate route;

routing offered traffic through said multi-stage switching unit along the selected candidate route;

dividing calls into priority calls and non-priority calls according to a preset criteria; and performing a priority control to favor the priority calls over the non-priority calls such that the priority calls are transferred before the non-priority calls;

wherein the cell loss rates are obtained by:

(a) determining a probability distribution function indicating a probability for a given number of cells to be transferred from multiplexed calls during a prescribed time, for each class of the priority calls and the non-priority calls; and (b) calculating the cell loss rate for each class of the priority calls and the non-priority calls from the probability distribution function for each class of the priority calls and the non-priority calls, and wherein the step (a) determines the probability distribution functions by:

(a1) dividing calls into high speed calls and low speed calls according to peak bit rates of calls;

(a2) calculating a first probability for a given number of cells to be transferred from high speed calls during a prescribed time, and a second probability for a given number of cells to be transferred from low speed calls during a prescribed time, for each class of the priority calls and the non-priority calls; and (a3) calculating a convolution of the first probability and the second probability for each class of the priority calls and the non-priority calls to obtain the probability distribution function for each class of the priority calls and the non-priority calls.

6. A method of call admission control in an Asynchronous Transfer Mode (ATM) network wherein calls comprising a plurality of cells are transferred along the network which includes a plurality of nodes interconnected by communication links, wherein each node is adapted to communicate with a plurality of other nodes and including a multiplexer for coupling incoming links to an outgoing multiplexed line, the method comprising the steps of:

dividing calls into priority calls and non-priority calls according to a preset criteria; and performing a call admission control to determine whether to accept or reject a call set-up request by evaluating cell loss rates along candidate routes between source and destination nodes so as to favor the priority calls over the non-priority calls such that the priority calls are transferred before the non-priority calls;

wherein the cell loss rates are obtained by:

(a) determining a probability distribution function indicating a probability for a given number of cells to be transferred from multiplexed calls during a prescribed time, for each class of the priority calls and the non-priority calls; and (b) calculating the cell loss rate for each class of the priority calls and the non-priority calls from the probability distribution function for each class of the priority calls and the non-priority calls, and wherein the step (a) determines the probability distribution functions by:

(a1) dividing calls into high speed calls and low speed calls according to peak bit rates of calls;

(a2) calculating a first probability for a given number of cells to be transferred from high speed calls during a prescribed time, and a second probability for a given number of cells to be transferred from low speed calls during a prescribed time, for each class of the priority calls and the non-priority calls; and (a3) calculating a convolution of the first probability and the second probability for each class of the priority calls and the non-priority calls to obtain the probability distribution function for each class of the priority calls and the non-priority calls.

* * * * *